United States Patent
Borsutsky et al.

(10) Patent No.: US 10,013,980 B2
(45) Date of Patent: Jul. 3, 2018

(54) COMBINED MENU-BASED AND NATURAL-LANGUAGE-BASED COMMUNICATION WITH CHATBOTS

(71) Applicant: Microsoft Technology Licensing, LLC, Redmond, WA (US)

(72) Inventors: Yuval Pinchas Borsutsky, Rishon LeZion (IL); Keren Damari, Tel Aviv (IL); William D. Ramsey, Redmond, WA (US); Benny Schlesinger, Ramat HaSharon (IL); Eldar Cohen, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/285,157

(22) Filed: Oct. 4, 2016

(65) Prior Publication Data

US 2018/0096686 A1    Apr. 5, 2018

(51) Int. Cl.
*G06F 17/27* (2006.01)
*G10L 15/22* (2006.01)
(Continued)

(52) U.S. Cl.
CPC ............ *G10L 15/222* (2013.01); *G10L 15/18* (2013.01); *H04L 51/02* (2013.01); *G06F 3/167* (2013.01);
(Continued)

(58) Field of Classification Search
CPC ....... G10L 15/22; G10L 15/265; G06F 3/167; H04M 2201/40
(Continued)

(56) References Cited

U.S. PATENT DOCUMENTS

| | | | |
|---|---|---|---|
| 7,143,039 B1 * | 11/2006 | Stifelman | G10L 15/22 379/88.01 |
| 2006/0150119 A1 | 7/2006 | Chesnais et al. | |

(Continued)

FOREIGN PATENT DOCUMENTS

IN    274/KOL/2007    5/2008

OTHER PUBLICATIONS

Argamon, et al., "Enhancing Virtual Agents with Structured Knowledge", Jul. 2016, pp. 1-29, eContext, retrieved at <<https://www.econtext.com/wp-content/uploads/eContext-VA-Whitepaper-July-2016-Enhancing-Virtual-Agents-With-Structured-Knowledge.pdf?submission=50147488>>.
(Continued)

*Primary Examiner* — Jesse Pullias
(74) *Attorney, Agent, or Firm* — Lyon & Harr, LLP; Richard T. Lyon

(57) ABSTRACT

A user is allowed to communicate with a chatbot. A menu is provided to the user that includes a list of actions that can be performed by the user. Whenever natural language input asking a question is received from the user, this input is forwarded to the chatbot, a response to this input is received from the chatbot, this response is provided to the user, and the menu is again provided to the user. Whenever natural language input is received from the user requesting an action that is not one of the actions in the menu, this input is forwarded to the chatbot, a response to this input is received from the chatbot, where this response includes another menu that includes a list of subsequent actions that are related to the requested action and can be performed by the user, and this other menu is provided to the user.

20 Claims, 22 Drawing Sheets

(51) Int. Cl.
    *H04L 12/58*     (2006.01)
    *G10L 15/18*     (2013.01)
    *G06F 3/16*     (2006.01)
    *G10L 15/30*     (2013.01)

(52) U.S. Cl.
    CPC ........ *G10L 15/30* (2013.01); *G10L 2015/223* (2013.01)

(58) Field of Classification Search
    USPC .......................................... 704/231–257, 275
    See application file for complete search history.

(56) References Cited

U.S. PATENT DOCUMENTS

| | | | |
|---|---|---|---|
| 2009/0100160 A1* | 4/2009 | Bowerman | G06F 15/173 709/223 |
| 2009/0193123 A1* | 7/2009 | Mitzlaff | G06F 17/30525 709/227 |
| 2012/0030301 A1 | 2/2012 | Herold et al. | |
| 2012/0260263 A1 | 10/2012 | Edoja | |
| 2013/0144961 A1 | 6/2013 | Park et al. | |
| 2013/0326413 A1* | 12/2013 | Croft | G06F 3/0481 715/811 |
| 2014/0122083 A1 | 5/2014 | Xiaojiang | |
| 2014/0122407 A1 | 5/2014 | Duan | |
| 2014/0279050 A1 | 9/2014 | Makar et al. | |
| 2015/0161241 A1 | 6/2015 | Haggar et al. | |
| 2015/0169286 A1* | 6/2015 | Ezra | G06F 3/167 715/728 |
| 2016/0035353 A1* | 2/2016 | Chen | G10L 17/22 704/235 |
| 2016/0057083 A1* | 2/2016 | Ciofalo | H04L 51/02 709/206 |
| 2017/0353404 A1* | 12/2017 | Hodge | H04L 51/02 |

OTHER PUBLICATIONS

Salvacion, "Microsoft's Chatbot Xiaoice Relaunched with Latest Features", Aug. 22, 2015, pp. 5, YIBADA, retrieved at <<http://en.yibada.com/articles/56011/20150822/microsoft-chatbot-xiaoice-re-launch-latest-features.htm#ixzz3m5KytSt0>>.

\* cited by examiner

2000

Hi

⇦ Welcome to Joe's Pizza. I can take your order, make a reservation, or answer any questions you have. How can I help you?

| Place An Order |
| Hours We're Open |
| Make A Reservation |
| Contact Info |

2002

How late are you open?

⇦ Which day interests you?

Saturday

⇦ Saturday 11:00 AM - 10:00 PM. What would you like to do?

| Place An Order |
| Hours We're Open |
| Make A Reservation |
| Contact Info |

2002

I want a pizza

⇦ Select a size:

| Small | Medium | Large |

COMBINED MENU-BASED AND NATURAL-LANGUAGE-BASED COMMUNICATION WITH CHATBOTS

BACKGROUND

The Internet is a global data communications system that serves billions of people across the globe and provides them access to a vast array of online information resources and services including those provided by the World Wide Web and intranet-based enterprises. Thanks to the ubiquity of the Internet and the wide variety of network-enabled end-user computing devices that exist today, people today spend a large and ever-increasing amount of time performing a wide variety of actions online (e.g., using various types of end-user computing devices that are configured to operate over a data communication network). A wide variety of computing (e.g., software-based) applications exist today that people can use to perform desired actions, where these applications often involve the transfer of information across a data communication network such as the Internet (among other types of networks). Chatbots are increasingly being employed in many of these computing applications in order to make it easier for people interact with the applications and accomplish their desired actions. As such, people are increasingly communicating (e.g., conversing) with chatbots as they perform desired actions online.

SUMMARY

Chatbot communication technique implementations described herein generally allow a user to communicate with a chatbot. In one exemplary implementation an initial menu is provided to the user that includes a list of actions that can be performed by the user. Then, whenever natural language input is received from the user that asks a question, this question input is forwarded to the chatbot. A response to the question input is then received from the chatbot, this response is provided to the user, and the initial menu is again provided to the user. In another exemplary implementation, whenever natural language input is received from the user that requests an action that is not one of the actions in the initial menu, this action request input is forwarded to the chatbot. A response to the action request input is then received from the chatbot, where this action request input response includes another menu that includes a list of subsequent actions that are related to the requested action and can be performed by the user, and this other menu is provided to the user. In yet another exemplary implementation, whenever the user selects one of the actions in the initial menu, the selected action is forwarded to the chatbot. A response to the selected action is then received from the chatbot, where this selected action response includes a subsequent menu that includes a list of subsequent actions that are related to the selected action and can be performed by the user, the subsequent menu is provided to the user, and the selected action is assigned to be a current action. Then, whenever natural language input is received from the user that requests an action that is not one of the subsequent actions in the subsequent menu, the current action is aborted and this action request input is forwarded to the chatbot. A response to the action request input is then received from the chatbot, where this action request input response includes another menu that includes a list of subsequent actions that are related to the requested action and can be performed by the user, and this other menu is provided to the user.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the chatbot communication technique implementations described herein will become better understood with regard to the following description, appended claims, and accompanying drawings where:

FIGS. 20 and 21 are diagram illustrating an exemplary conversation, in a simplified and abbreviated form, that a user has with an exemplary chatbot according to the chatbot communication technique implementations described herein.

DETAILED DESCRIPTION

Figure 1:
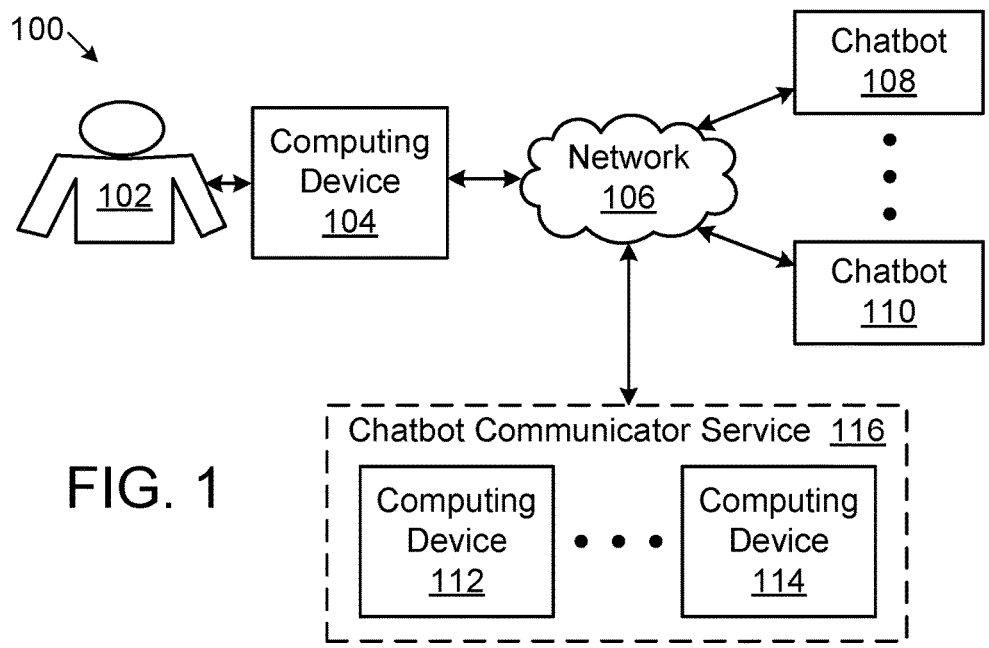
FIG. 1 is a diagram illustrating one implementation, in simplified form, of a system framework for realizing the chatbot communication technique implementations described herein.

In the following description of chatbot communication technique implementations reference is made to the accompanying drawings which form a part hereof, and in which are shown, by way of illustration, specific implementations in which the chatbot communication technique can be practiced. It is understood that other implementations can be utilized and structural changes can be made without departing from the scope of the chatbot communication technique implementations.

It is also noted that for the sake of clarity specific terminology will be resorted to in describing the chatbot communication technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version", or "one variant", or "another variant", or an "exemplary variant", or an "alternate variant" means that a particular feature, a particular structure, or particular characteristics described in connection with the implementation/version/variant can be included in at least one implementation of the chatbot communication technique. The appearances of the phrases "in one implementation", "in another implementation", "in an exemplary implementation", "in an alternate implementation", "in one version", "in another version", "in an exemplary version", "in an alternate version", "in one variant", "in another variant", "in an exemplary variant", and "in an alternate variant" in various places in the specification are not necessarily all referring to the same implementation/version/variant, nor are separate or alternative implementations/versions/variants mutually exclusive of other implementations/versions/variants. Yet furthermore, the order of process flow representing one or more implementations, or versions, or variants of the chatbot communication technique does not inherently indicate any particular order nor imply any limitations of the chatbot communication technique.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Chatbots

As is appreciated in the arts of the Internet, electronic messaging, artificial intelligence, and natural language understanding, a chatbot (also known as a chat bot, a chatterbot, a talkbot, and a chat robot, among other things) is a computer-based, artificially intelligent conversational agent/entity that is designed to conduct a natural human conversation (e.g., chat) with one or more users. More particularly, a chatbot responds to input from users in a way that moves the conversation forward in a contextually meaningful way, thus generating the illusion of intelligent understanding. In other words, chatbots are generally designed to convincingly simulate how a human would interact and behave as a conversational/chat partner. A general goal of many chatbots is to provide value and ease of use to users by trying to understand what they want and then providing them with the information they need, or performing the action(s) they are requesting. Beyond this general goal, some sophisticated chatbots also attempt to pass the conventional Turing Test and thus make each user that is communicating with the chatbot think that they are talking to another person rather than interacting with a computer program. The term "user" is used herein to refer to a person who utilizes a network-enabled end-user computing device to communicate with a chatbot. Exemplary types of network-enabled end-user computing devices are described in more detail hereafter.

As described heretofore, a wide variety of computing (e.g., software-based) applications exist today that people can use to perform desired actions, where these applications often involve the transfer of information across a data communication network such as the Internet (among other types of networks). Chatbots are increasingly being employed in many of these computing applications in order to make it easier for people interact with the applications and accomplish their desired actions. Exemplary computing applications that currently employ chatbots include electronic commerce and banking applications, customer service applications, electronic messaging applications, automated online assistance applications that provide "call center" and customer assistance functionality, intelligent personal assistant applications such as SIRI® (a registered trademark of Apple Inc.) and CORTANA® (a registered trademark of Microsoft Corporation), weather and news provisioning applications, and online gaming applications, among many others. The conversational intelligence of a given chatbot is typically limited to a particular context or range of contexts that correspond to the particular computing application for which the chatbot is being employed.

Conventional (e.g., existing) chatbots can be generally classified into the following two categories. One category of conventional chatbots allows a user to utilize only a succession of menus to communicate with the chatbots, where each of the menus presents the user with a set of actions from which they can choose—chatbots in this particular category are hereafter simply referred to as menu-based chatbots. Another category of conventional chatbots allows the user to utilize only natural language to communicate (e.g., interact/converse/chat) with the chatbots—chatbots in this particular category are hereafter simply referred to as natural-language-based chatbots. The term "natural language" is used herein to refer to any word, or phrase, or one or more complete sentences that a user inputs to an end-user computing device. Natural-language-based chatbots generally employ conventional natural language processing methods to interpret the user's natural language input to the chatbots. More sophisticated natural-language-based chatbots may combine conventional machine learning methods with the natural language processing methods to increase the conversational intelligence of the chatbots and thus broaden the range of contexts that they can support. Both menu-based chatbots and natural-language-based chatbots have particular shortcomings which may decrease the speed and accuracy by which the user is able to effectively communicate their desires to the chatbots, thus potentially frustrating the user and increasing the amount of time and effort it takes for them to complete a desired action using the chatbots. Exemplary shortcomings and comparative advantages of menu-based chatbots and natural-language-based chatbots will now be described in more detail.

When a user is communicating with a menu-based chatbot they often have to navigate through a long sequence of nested menus in order to accomplish a desired action (e.g., entering a food order for a given restaurant, or modifying or cancelling a food order that the user has already entered, or booking a room for a given hotel, or modifying or cancelling a room booking that has already been entered, or the like). In contrast, it will be appreciated that such a desired action could be accomplished more quickly if the user was communicating with a natural-language-based chatbot. Additionally, when a user is communicating with a menu-based chatbot they often have a difficult time figuring out where a desired action is located in the just-described sequence of nested menus. In contrast, if the user was communicating with a natural-language-based chatbot there would be no need to figure out where a desired action is located since the user can simply input natural language to the chatbot that describes the desired action. Finally, the system of nested menus that forms the basis for a menu-based chatbot is inherently constrained and thus allows a user to perform only a restricted set of actions. In contrast, a natural-language-based chatbot has no such constraint since the user is free to input any desired natural language to the chatbot.

When a user is communicating with a natural-language-based chatbot they may encounter the need to input a large number of characters or speak a large number of words in order to accomplish a desired action. In contrast, such a desired action could be selected easily if the user was communicating with a menu-based chatbot that listed the desired action in one of its menus. Additionally, when a user is communicating with a natural-language-based chatbot they may have difficulties discovering what the chatbot can do for them. Although the chatbot may initially present the user with a welcome message that introduces the chatbot to the user, it is not feasible to overload the user by describing all of the different actions that the chatbot is able to perform in this welcome message. In contrast, a menu-based chatbot may utilize a hierarchically-organized sequence of menus to guide the user through all of the different actions that the chatbot can perform in a step-by-step manner.

2.0 Combined Menu-Based and Natural-Language-Based Communication with Chatbots The chatbot communication technique implementations described herein generally allow a user to communicate (e.g., have a conversation) with a given chatbot using a combined menu-based and natural-language-based user interface that, for each interaction the user has with the chatbot, permits the user to dynamically (e.g., on-the-fly) choose between generating their input to the chatbot either using a menu-based user interface that is navigated by the user, or using natural language that is either typed or spoken by the user. The chatbot communication technique implementations are advantageous for various reasons including, but not limited to, the following. As will be appreciated from the foregoing and the more-detailed description that follows, the chatbot communication technique implementations are operable with any type of chatbot that is employed in any type of computing application including, but not limited to, any of the aforementioned different types of applications. The chatbot communication technique implementations may also be incorporated into any conventional search engine. The chatbot communication technique implementations also address the aforementioned shortcomings of menu-based and natural-language-based chatbots since for each interaction the user has with a given chatbot the user is able to generate their input to the chatbot using either the menu-based user interface or natural language. As such, the chatbot communication technique implementations increase the speed and accuracy by which the user is able to effectively communicate their desires to the chatbot, thus increasing the user's efficiency and productivity.

FIG. 1 illustrates one implementation, in simplified form, of a system framework for realizing the chatbot communication technique implementations described herein. As exemplified in FIG. 1 the system framework 100 includes an end-user computing device 104 that is utilized by a user 102 to perform a wide variety of actions. The computing device 104 can be any type of conventional mobile computing device such as a smartphone, or a tablet computer, or a laptop computer (sometimes also referred to as a notebook or netbook computer), or a computing device that is integrated into an automobile, among other types of conventional mobile computing devices. The computing device 104 can also be any type of conventional non-mobile computing device such as a desktop personal computer (PC), or a video game console, among other types of conventional non-mobile computing devices.

Referring again to FIG. 1, the end-user computing device 104 is configured to communicate over a conventional data communication network 106 (herein also referred to as a computer network) such as the Internet (among other types of conventional data communication networks) with a chatbot communicator service 116 that runs on one or more other computing devices 112/114. These other computing devices 112/114 can also communicate with each other via the network 106. In an exemplary implementation of the chatbot communication technique described herein the other computing devices 112/114 are located in the cloud so that the chatbot communicator service 116 operates as a cloud service and the network 106 includes wide area network functionality. The term "cloud service" is used herein to refer to a web application that operates in the cloud and can be hosted on (e.g., deployed at) a plurality of data centers that can be located in different geographic regions (e.g., different regions of the world). As will be described in more detail hereafter, the chatbot communicator service 116 generally performs a variety of functions associated with allowing the user 102 to communicate with one or more chatbots 108/110 in a manner that optimizes the efficiency and productivity of the user 102. As described heretofore, each of the chatbots 108/110 is employed by a given computing application (not shown) in order to make it easier for the user 102 to interact with the application.

Figure 2:
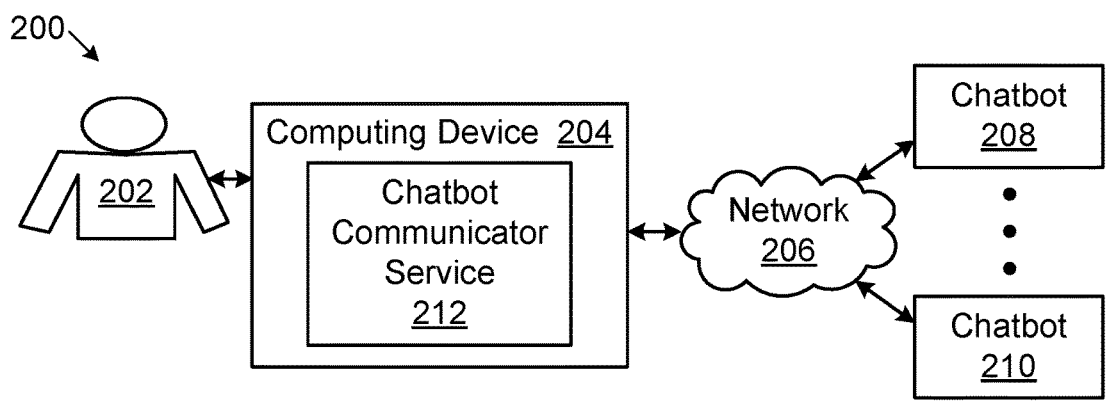
FIG. 2 is a diagram illustrating another implementation, in simplified form, of a system framework for realizing the chatbot communication technique implementations described herein.

FIG. 2 illustrates another implementation, in simplified form, of a system framework for realizing the chatbot communication technique implementations described herein. As exemplified in FIG. 2 the system framework 200 includes the aforementioned end-user computing device 204 that is utilized by a user 202 to perform a wide variety of actions, and is configured to communicate over the aforementioned data communication network 206 with the aforementioned one or more chatbots 208/210. The system framework 200 also includes a chatbot communicator service 212 that runs on the computing device 204. As will be described in more detail hereafter, this service 212 generally performs a variety of functions associated with allowing the user 202 to communicate with the chatbots 208/210 in a manner that optimizes the efficiency and productivity of the user 202.

Figure 3:
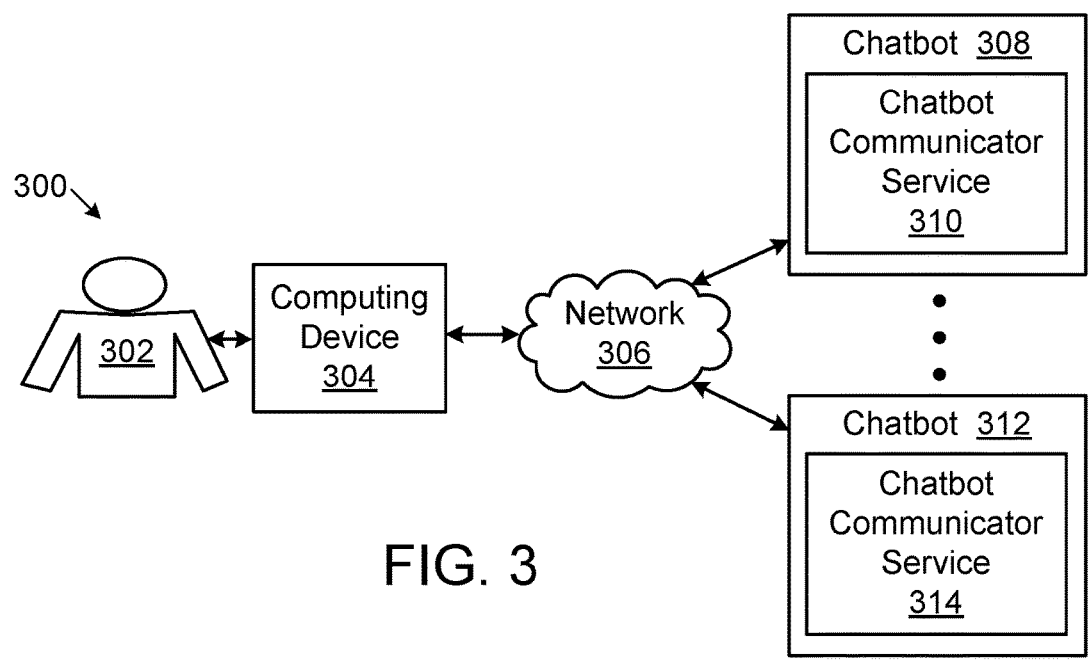
FIG. 3 is a diagram illustrating yet another implementation, in simplified form, of a system framework for realizing the chatbot communication technique implementations described herein.
Figure 4:
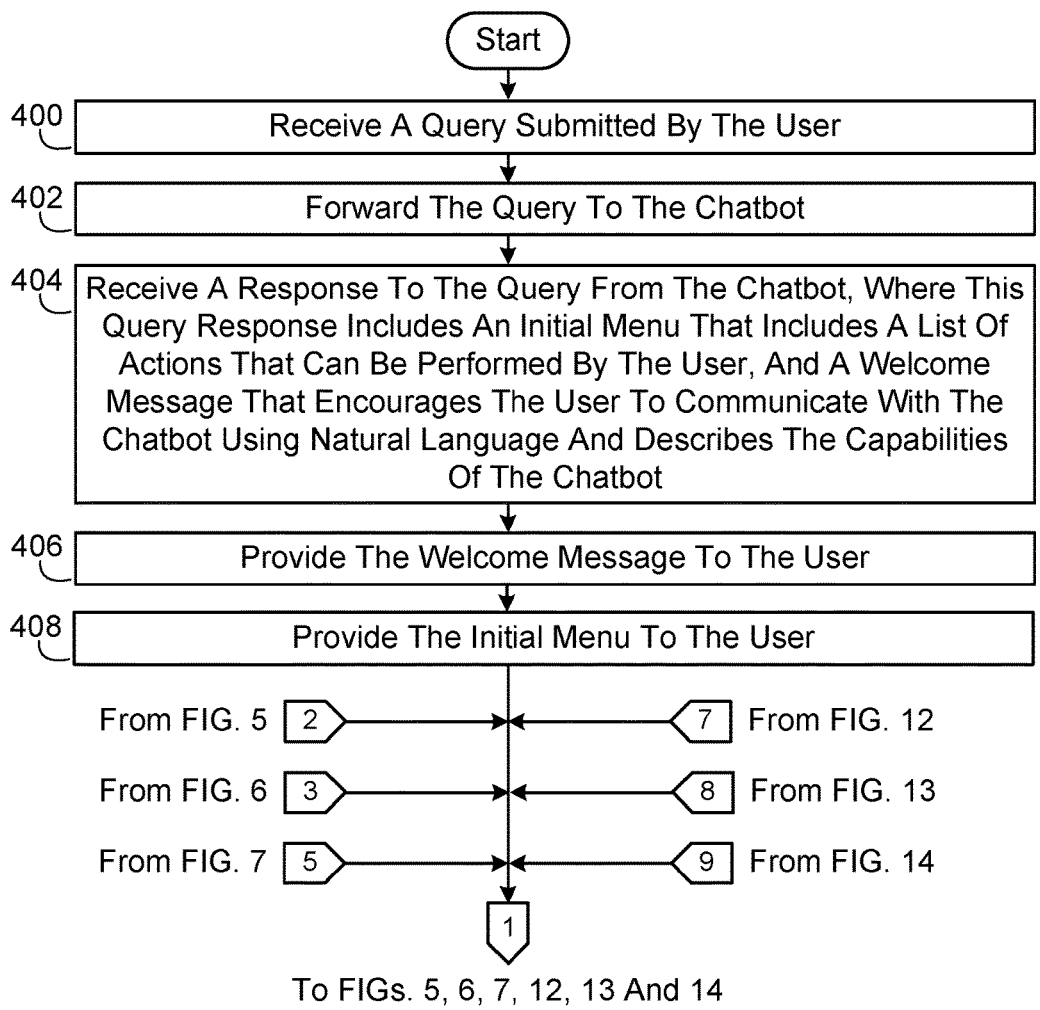
FIGS. 4-14 are a flow diagram illustrating one implementation, in simplified form, of a process for allowing a user to communicate with a chatbot.
Figure 5:
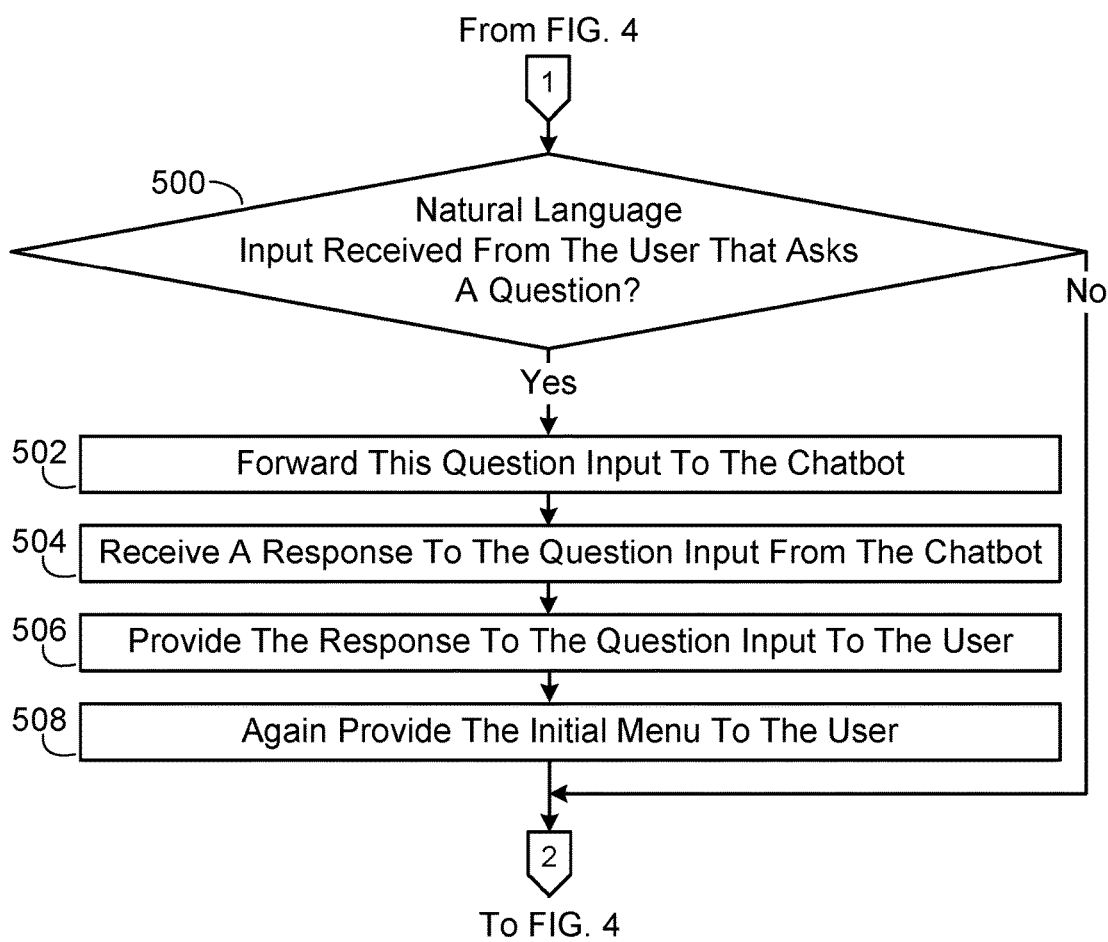

FIG. 3 illustrates yet another implementation, in simplified form, of a system framework for realizing the chatbot communication technique implementations described herein. As exemplified in FIG. 3 the system framework 300 includes the aforementioned end-user computing device 304 that is utilized by a user 302 to perform a wide variety of actions, and is configured to communicate over the aforementioned data communication network 306 with one or more chatbots 308/312. Each of the chatbots 308/312 is employed by a given computing application (not shown) in order to make it easier for the user 302 to interact with the application. A chatbot communicator service 310/314 is integrated within each of the chatbots 308/312. As will be described in more detail hereafter, this service 310/314 generally performs a variety of functions associated with allowing the user 302 to communicate with the chatbots 308/312 in a manner that optimizes the efficiency and productivity of the user 302.

FIGS. 4-14 illustrate one implementation, in simplified form, of a process for allowing a user to communicate with a chatbot. In one implementation of the chatbot communication technique described herein the process illustrated in FIGS. 4-14 is realized on the system framework 100 illustrated in FIG. 1. In another implementation of the chatbot communication technique the process illustrated in FIGS. 4-14 is realized on the system framework 200 illustrated in FIG. 2. In yet another implementation of the chatbot communication technique the process illustrated in FIGS. 4-14 is realized on the system framework 300 illustrated in FIG. 3 As exemplified in FIG. 4 the process starts with receiving a query submitted by the user (process action 400), where this query is intended for the chatbot. It will be appreciated that the query may be a simple salutation (e.g., "Hi", or "Hello", or the like), and may include any type of user request such as a question, or a request for information, or a request to perform a desired action, among other type of user requests. The query is then forwarded to the chatbot (process action 402). A response to the query is then received from the chatbot, where this query response includes an initial menu that includes a list of actions that can be performed by the user, and a welcome message that encourages the user to communicate with the chatbot using natural language and describes the general (e.g., the top-level) capabilities of the chatbot (process action 404). The welcome message and the initial menu are then provided to the user (process actions 406 and 408). An exemplary welcome message and initial menu are provided hereafter as part of an exemplary conversation that a user has with an exemplary chatbot.

It will be appreciated that the aforementioned query may be submitted by the user in a variety of forms and associated ways. By way of example but not limitation, in one implementation of the chatbot communication technique described herein where the end-user computing device that the user is utilizing to communicate with the chatbot includes some type of keyboard, the query may be in the form of a text string that is manually entered by the user. More particularly, in the case where the end-user computing device includes a physical keyboard that is connected to the computing device, the user may manually enter the text string by typing it on the physical keyboard. In the case where the end-user computing device includes a touch-sensitive display screen upon which a virtual keyboard is displayed, the user may manually enter the text string by typing it on the virtual keyboard. In another implementation of the chatbot communication technique where the end-user computing device that the user is utilizing to communicate with the chatbot includes some type of audio capture device (e.g., one or more microphones, or the like) and speech recognition functionality, the query may be in the form of speech that is uttered by the user. More particularly, the query may be either a word that is spoken by the user, or a phrase that is spoken by the user, or one or more sentences that are spoken by the user.

Referring again to FIG. 4, as is appreciated in the art of menu-based systems and interfaces, and as will be appreciated from the more-detailed description that follows, the initial menu that is received from the chatbot in action 404 may be either a top-level (e.g., parent) menu of a user-navigable, hierarchically-organized chain of nested sub-menus, or any one of these sub-menus. As exemplified in FIG. 5, whenever natural language input is received from the user that asks a question (process action 500, Yes), this question input is forwarded to the chatbot (process action 502). Then, upon receiving a response to the question input from the chatbot (process action 504), this response is provided to the user (process action 506) and the initial menu that was previously received from the chatbot is again provided to the user (process action 508). It will be appreciated that the response to the question input that is received from the chatbot in action 504 may be an answer to the question, or a request for the user to provide additional information that the chatbot needs to answer the question, among other things. Given the foregoing, it will also be appreciated that the combination of actions 500, 502, 504, 506 and 508 has the technical effect of increasing the speed and accuracy by which the user is able to effectively communicate their desires to the chatbot, thus increasing the user's efficiency and productivity.

The user may enter their natural language input in a variety of forms and associated ways. By way of example but not limitation, in one implementation of the chatbot communication technique described herein where the end-user computing device that the user is utilizing to communicate with the chatbot includes some type of keyboard, the natural language input may be in the form of a text string that is manually entered by the user. More particularly, in the case where the end-user computing device includes a physical keyboard that is connected to the computing device, the user may manually enter the text string by typing it on the physical keyboard. In the case where the end-user computing device includes a touch-sensitive display screen upon which a virtual keyboard is displayed, the user may manually enter the text string by typing it on the virtual keyboard. In another implementation of the chatbot communication technique where the end-user computing device that the user is utilizing to communicate with the chatbot includes some type of audio capture device and speech recognition functionality, the natural language input may be in the form of speech that is uttered by the user. More particularly, the natural language input may be either a word that is spoken by the user, or a phrase that is spoken by the user, or one or more sentences that are spoken by the user.

Given the foregoing and the more-detailed description that follows, it will be appreciated that the chatbot communication technique implementations described herein provide the user with the ability to choose to temporarily "ignore" the actions listed in a given menu that was just provided to them and conveniently input any natural language to the chatbot that they desire. This ability advantageously allows the user to ask the chatbot any question at any time during the user's conversation with the chatbot, where the user's question may be related to the current context of their conversation with the chatbot (e.g., the user can ask for help understanding the actions listed in the menu that was just provided to them). After receiving an answer to their question from the chatbot, the user can then easily resume completing whatever action they were in the middle of performing when they asked their question. For example, in the case where the user is browsing the items on a restaurant's menu they might ask "where are you located" or "do you have high chair or booster seat for baby". After getting the answer to their question the user is able to resume browsing the restaurant's menu.

Figure 6:
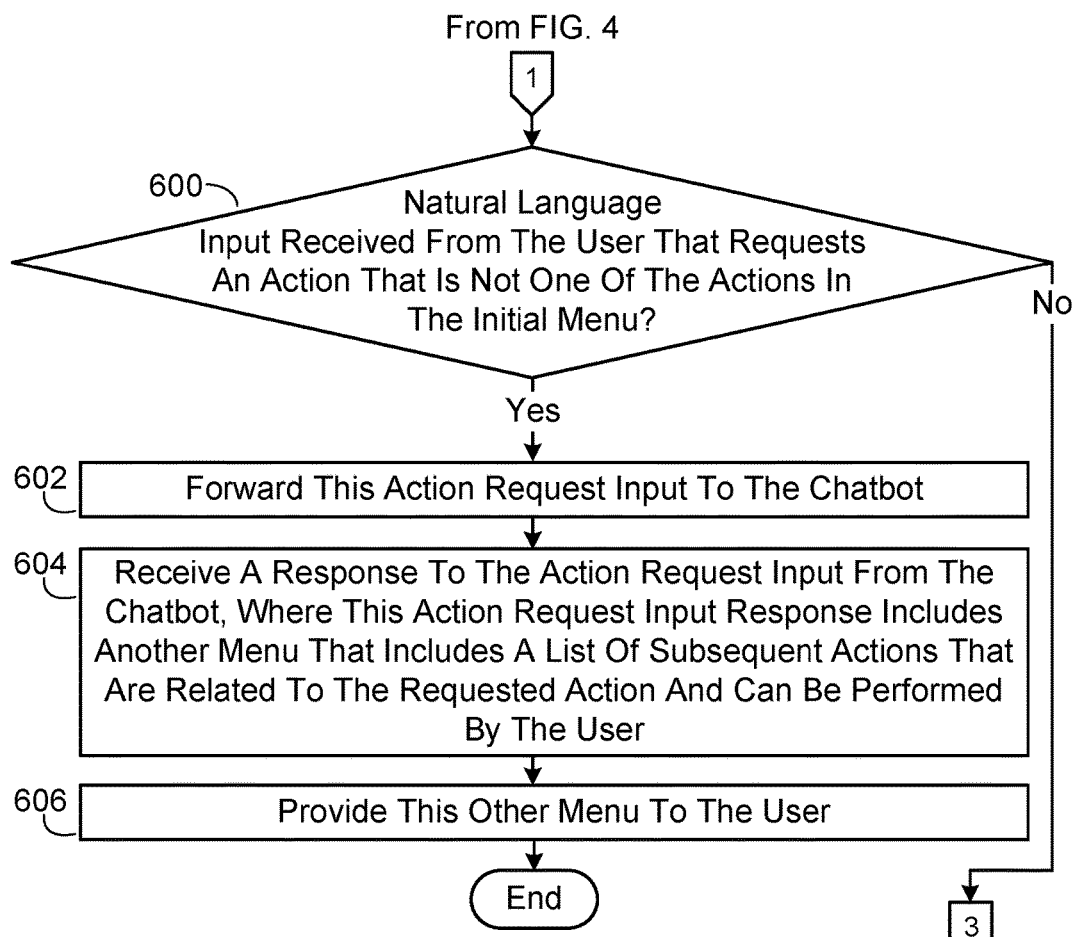

As exemplified in FIG. 6, whenever natural language input is received from the user that requests (e.g., indicates that the user wants to perform) an action that is not one of the actions in the initial menu (process action 600, Yes), this action request input is forwarded to the chatbot (process action 602). A response to the action request input is then received from the chatbot, where this action request input response includes another menu that includes a list of subsequent actions that are related to the requested action and can be performed by the user (process action 604). This other menu is then provided to the user (process action 606). It will be appreciated that the other menu that is received from the chatbot in action 604 may be any one of the sub-menus in the aforementioned hierarchically-organized chain of nested sub-menus.

Referring again to FIG. 6, it will be appreciated that actions 600/602/604/606 advantageously allow the user to conveniently switch to a desired action that may not be listed in a given menu that is currently being provided to the user. For example, consider the case where the user is communicating with a chatbot that is employed by a pizzeria. While the user is in the middle of entering a pizza order for the pizzeria, the user may request to browse the pizzeria's menu in order to see which other items are available to order, or they may request to view the current contents of their cart, or they may want to cancel their order. Actions 600/602/604/606 also advantageously allow the user to accomplish a desired specific action in a single interaction with the chatbot simply by inputting natural language that specifies the action to a desired level of detail, thus allowing the user to bypass/skip the plurality of menu-based interactions with the chatbot associated with having to navigate through a cumbersome sequence of menus in order to accomplish the action. For example, in the case where the user is communicating with the pizzeria's chatbot, upon receiving the chatbot's welcome message the user can simply input natural language that says "I want to order a large pepperoni pizza and 3 diet cokes". The chatbot communication technique implementations described herein will simply forward this natural language input to the chatbot. The chatbot can then automatically enter the user's order without having to ask the user to specify the desired items being ordered, the desired size and quantity thereof, the desired topping(s) thereon, and the quantity and type of drink(s) desired. Actions 600/602/604/606 also advantageously allow the user to respond to a given menu that is provided to them by specifying an option that is not listed in the menu. For example, in the aforementioned case where the user is in the middle of entering a pizza order for the pizzeria, when the chatbot asks the user to select the topping they want on their pizza and the chatbot provides the user with a sub-menu listing the topping options as being Mushrooms, Olives, Pepperoni, Onion, and Sausage, the user may respond by inputting natural language that says "mushroom only on half the pizza".

Figure 7:
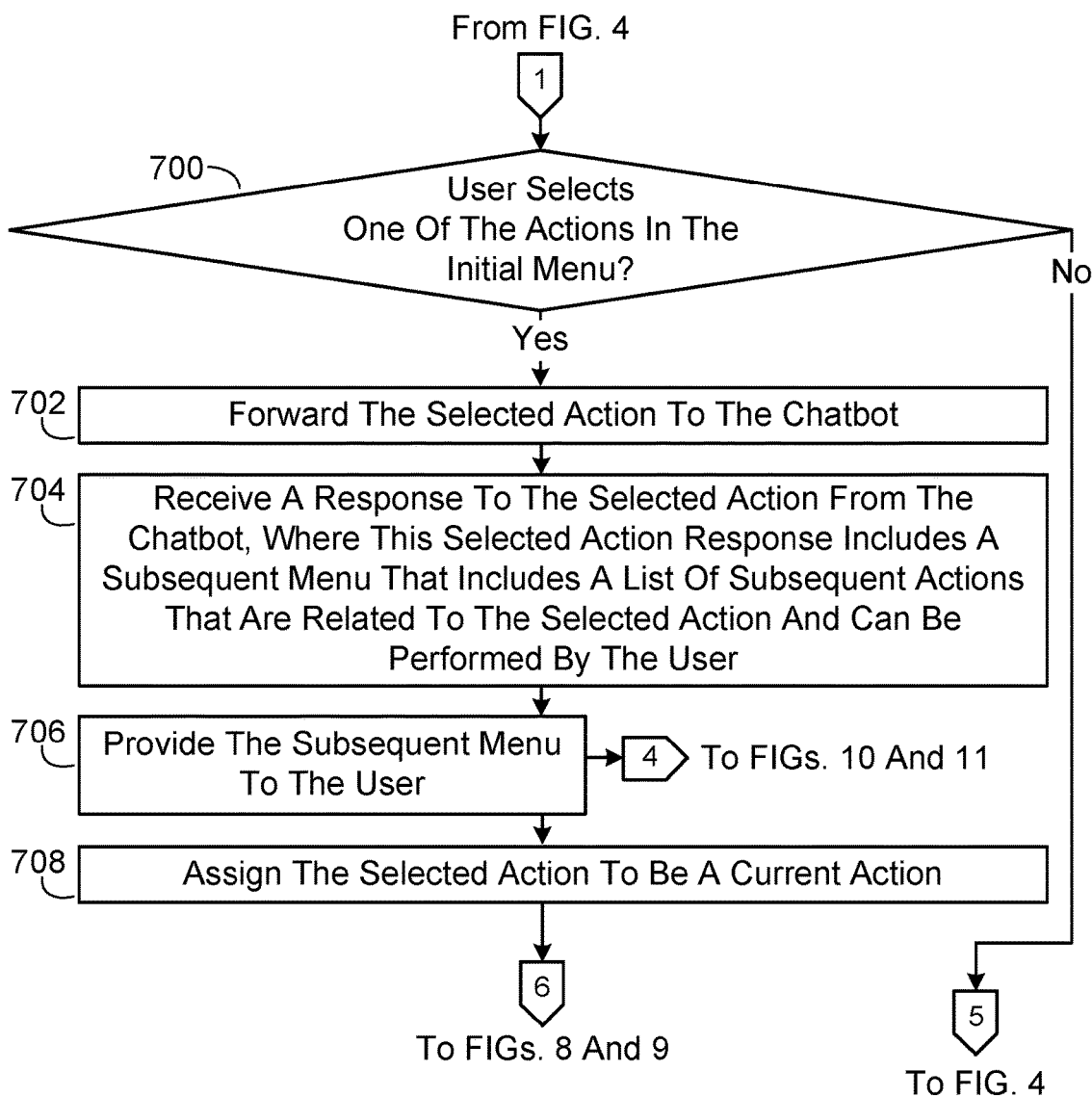
Figure 8:
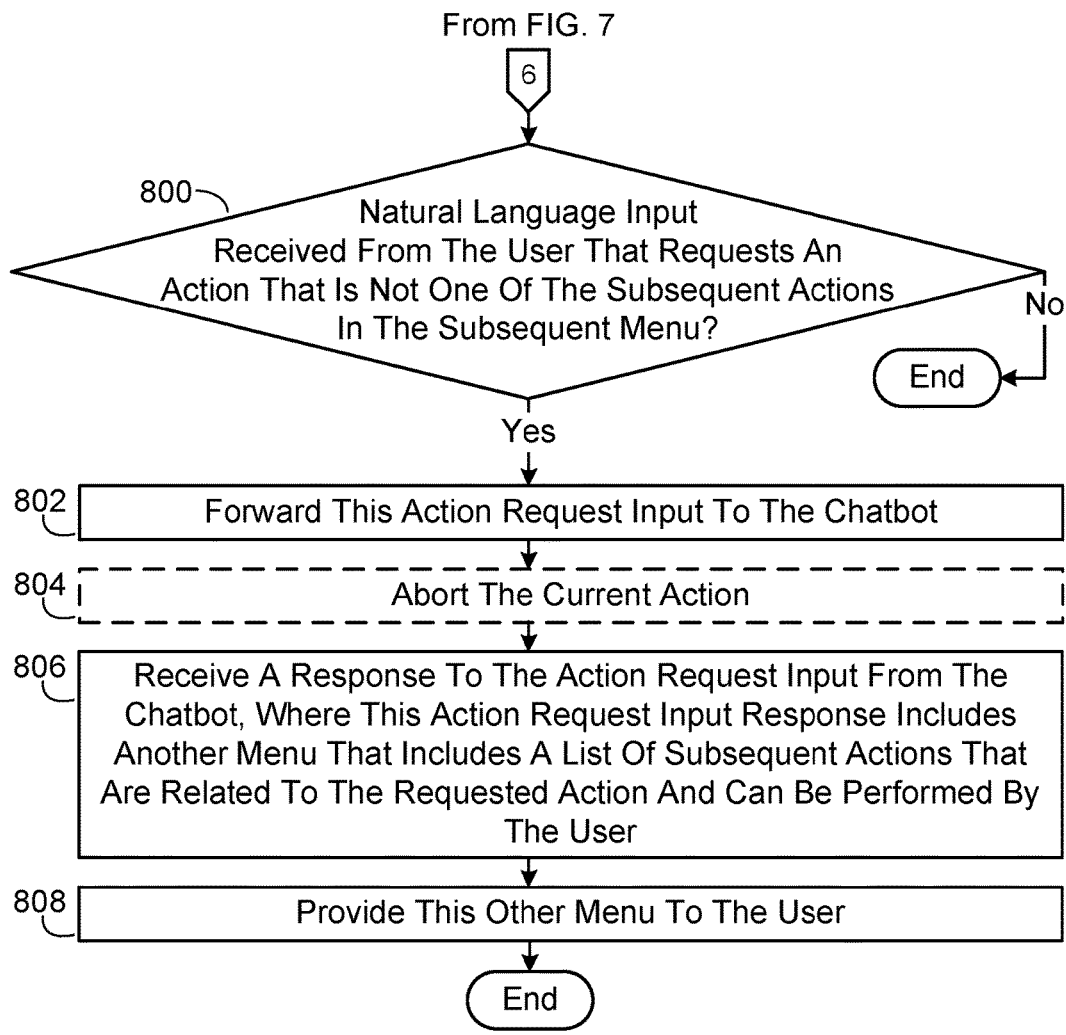

As exemplified in FIGS. 7 and 8, whenever the user selects one of the actions in the initial menu (process action 700, Yes), the selected action is forwarded to the chatbot (process action 702). A response to the selected action is then received from the chatbot, where this selected action response includes a subsequent menu that includes a list of subsequent actions that are related to the selected action and can be performed by the user (process action 704). This subsequent menu is then provided to the user (process action 706), and the selected action is assigned to be a current action (process action 708). In an exemplary implementation of the chatbot communication technique described herein the subsequent menu that is received from the chatbot in action 704 is one of the sub-menus in the aforementioned hierarchically-organized chain of nested sub-menus. Whenever natural language input is received from the user that requests an action that is not one of the subsequent actions in the subsequent menu (process action 800, Yes), this action request input is forwarded to the chatbot (process action 802). Depending on the specific nature of the current action (e.g., the action that was selected by the user in action 700) and the specific natural language input that is received from the user in action 800, the current action may also be aborted (e.g., stopped) (process action 804). The following are exemplary situations where the current action will not be aborted. In the case where the user uses a different wording for one of the subsequent actions that is listed in the subsequent menu (e.g., the menu lists "S, M, L" and the user says "small"), the current action will not be aborted. In the case where the user requests an action that does not appear in the subsequent menu but is still a contextually valid request (e.g., the menu lists "S, M, L" and user says "extra large"), the current action will not be aborted. In the case where the user says "back" to return to the previous step of the current action (e.g., the current action is "order a coffee" and the user wants to change the cup size for their order), the current action will not be aborted.

Referring again to FIG. 8, after the action request input has been forwarded to the chatbot (action 802), a response to the action request input is received from the chatbot, where this action request input response includes another menu that includes a list of subsequent actions that are related to the requested action and can be performed by the user (process action 806). This other menu is then provided to the user (process action 808). It will be appreciated that the other menu that is received from the chatbot in action 806 may be any one of the sub-menus in the aforementioned hierarchically-organized chain of nested sub-menus. In an exemplary implementation of the chatbot communication technique the just-described action of aborting the current action (action 804) can optionally include saving (e.g., storing) the current state of (e.g., the state that the user reached in) the current action. The aborted current action will thus be considered herein to be a pending (e.g., an unfinished) action.

It is noted that each of the different menus described herein that is provided to the user (e.g., the initial menu, the other menu, the subsequent menu, or the like) may be provided to the user in various ways. By way of example but not limitation, in one implementation of the chatbot communication technique described herein these menus may be realized as a conventional pop-up that is displayed on the display screen of the end-user computing device that the user is utilizing to communicate with the chatbot. Examples of such pop-up menus are provided hereafter as part of an exemplary conversation that a user has with an exemplary chatbot. In this particular implementation the user can select a desired one of the actions listed in a given menu in various ways such as by using a mouse to click on the desired action in the case where the end-user computing device is configured with a mouse, or by using a finger or the like to tap on the desired action in the case where the end-user computing device is configured with a touch-sensitive display screen, or by speaking the desired action in the case where the end-user computing device is configured with an audio capture device and speech recognition functionality, among other ways. In another implementation of the chatbot communication technique the menus described herein may be realized as a string of text that is displayed on the end-user computing device's display screen (e.g., a given menu might read "press 1 for PLACE AN ORDER, press 2 for HOURS WE'RE OPEN, press 3 for MAKE A RESERVATION, press 4 for CONTACT INFO". In this particular implementation the user can select a desired one of the actions listed in a given menu in various ways such as by typing the number associated with the desired action on a keyboard in the case where the end-user computing device is configured with a keyboard, or by speaking this number in the case where the end-user computing device is configured with an audio capture device and speech recognition functionality, among other ways.

Figure 9:
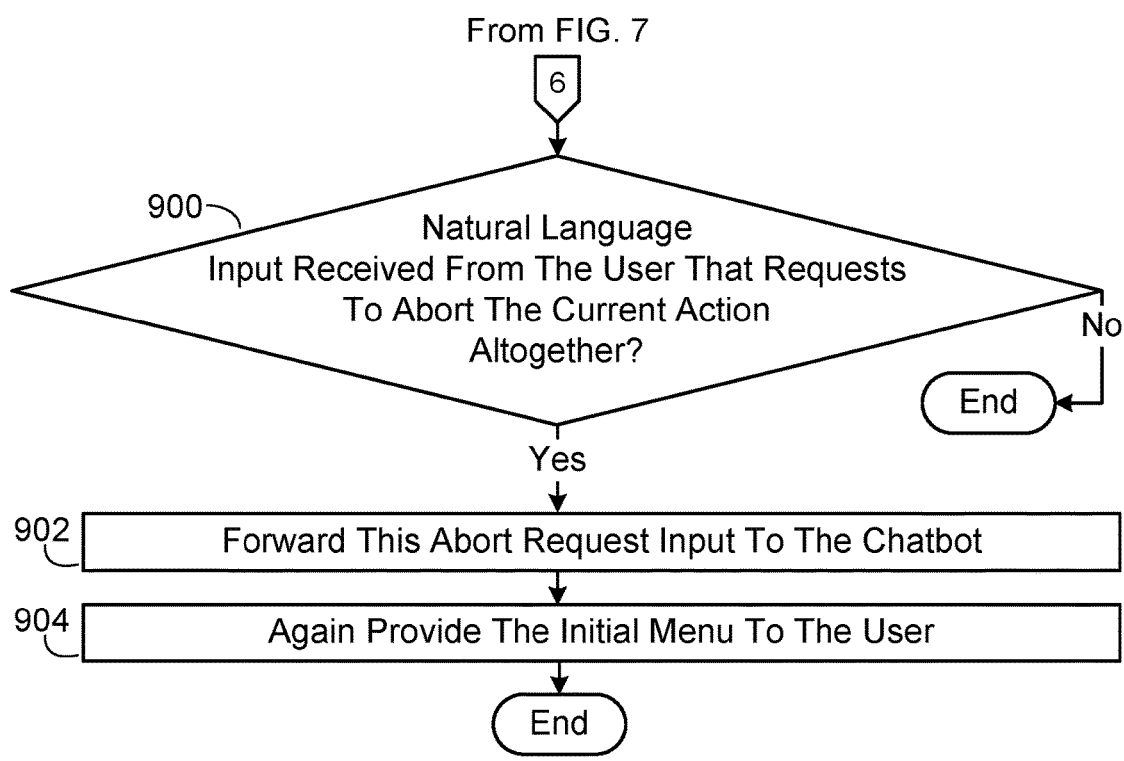
Figure 10:
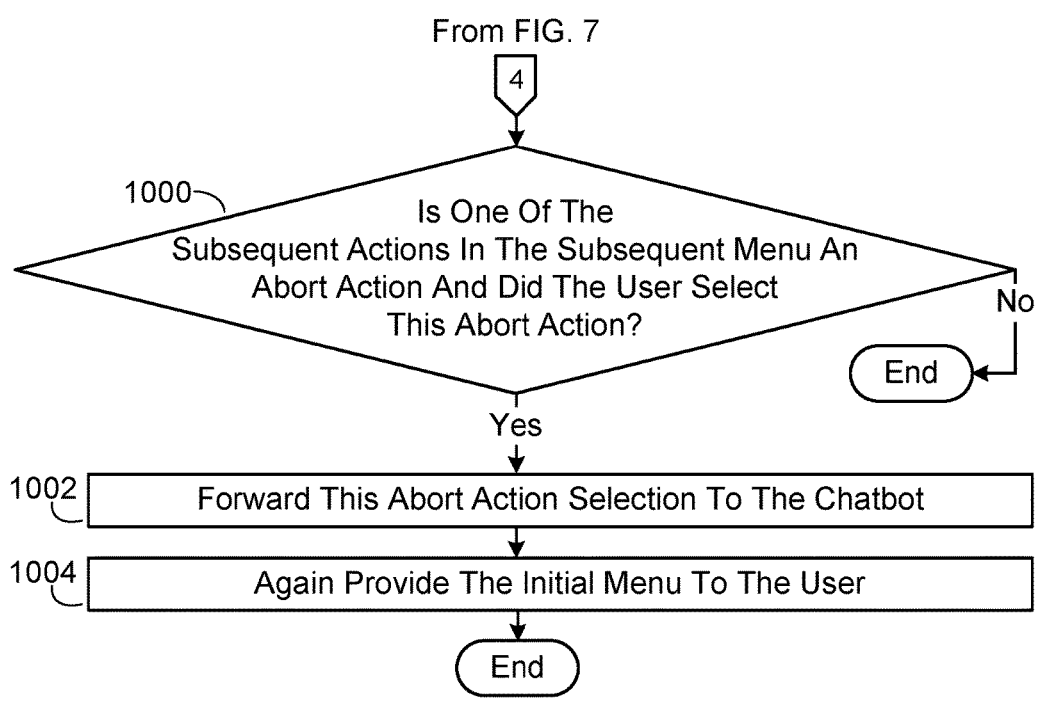

As exemplified in FIG. 9, whenever natural language input is received from the user that requests (e.g., indicates that the user wants) to abort the current action altogether (process action 900, Yes), this abort request input is forwarded to the chatbot (process action 902), and the initial menu that was previously received from the chatbot is again provided to the user (process action 904). It is noted that the chatbot communication technique implementations described herein allow the user to abort any action they are currently working on at any time during their conversation with the chatbot simply by inputting natural language that includes the word "abort", or the like. In an exemplary implementation of the chatbot communication technique described herein the just-described action of forwarding the abort request input to the chatbot (action 902) can optionally include saving the current state of the current action. The aborted current action will thus be considered herein to be a pending action.

In addition to the user being able to utilize natural language to abort the current action, one of the subsequent actions in the aforementioned subsequent menu may be an abort action. In this case, as exemplified in FIG. 10, whenever the user selects this abort action (process action 1000, Yes), this abort action selection is forwarded to the chatbot (process action 1002), and the initial menu that was previously received from the chatbot is again provided to the user (process action 1004). In an exemplary implementation of the chatbot communication technique described herein the just-described action of forwarding the abort action selection to the chatbot (action 1002) can optionally include saving the current state of the current action.

Figure 11:
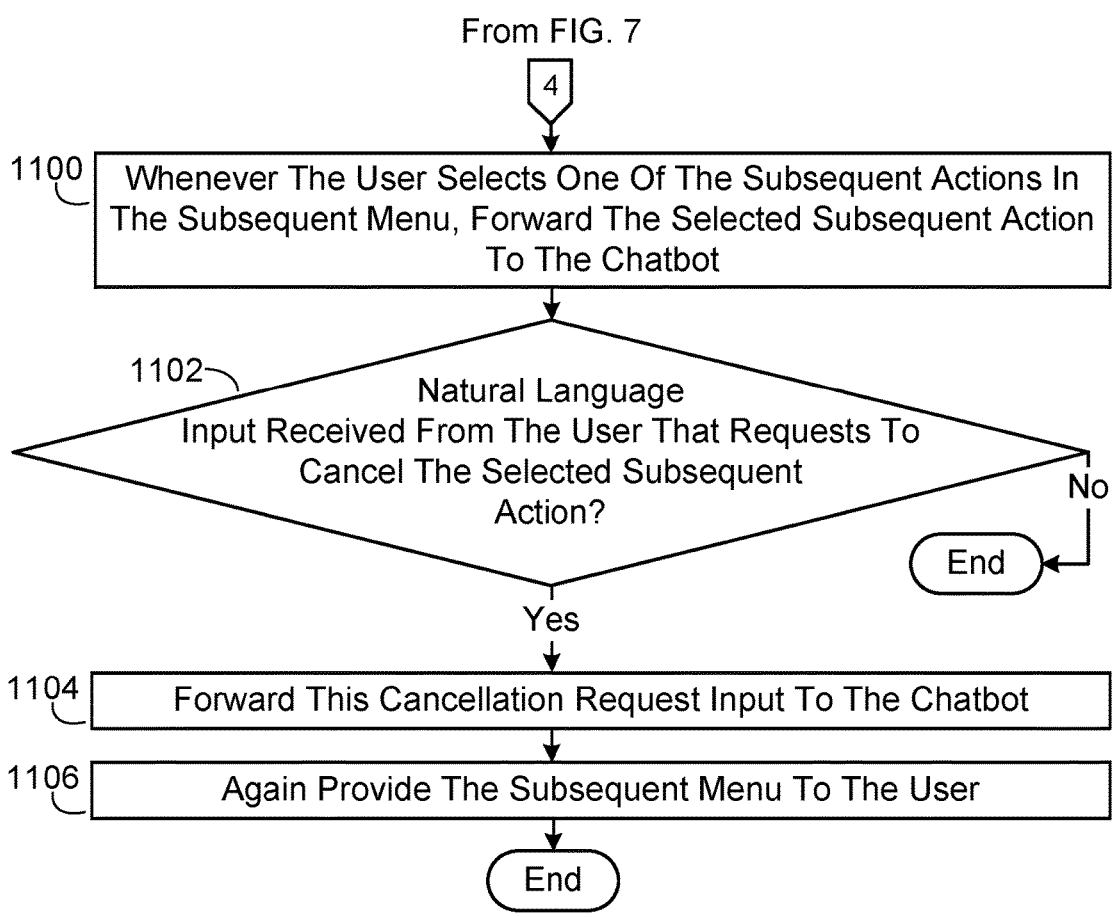

As exemplified in FIG. 11, whenever the user selects one of the subsequent actions in the subsequent menu, the selected subsequent action is forwarded to the chatbot (process action 1100). Then, whenever natural language input is received from the user that requests to cancel the selected subsequent action (process action 1102, Yes), this cancellation request input is forwarded to the chatbot (process action 1104), and the subsequent menu that was previously received from the chatbot is again provided to the user (process action 1106), which in effect returns the user to the state of their interaction with the chatbot just before they selected one of the subsequent actions. It is noted that the chatbot communication technique implementations described herein allow the user to cancel any action they are currently working on at any time during their conversation with the chatbot simply by inputting natural language that includes the words "cancel", or "back", or the like. In addition to the user being able to utilize natural language to cancel the selected subsequent action, it will be appreciated that after the user has selected one of the subsequent actions in the subsequent menu (action 1100) the user may be presented with another menu that includes a cancel action that may be selected by the user.

Figure 12:
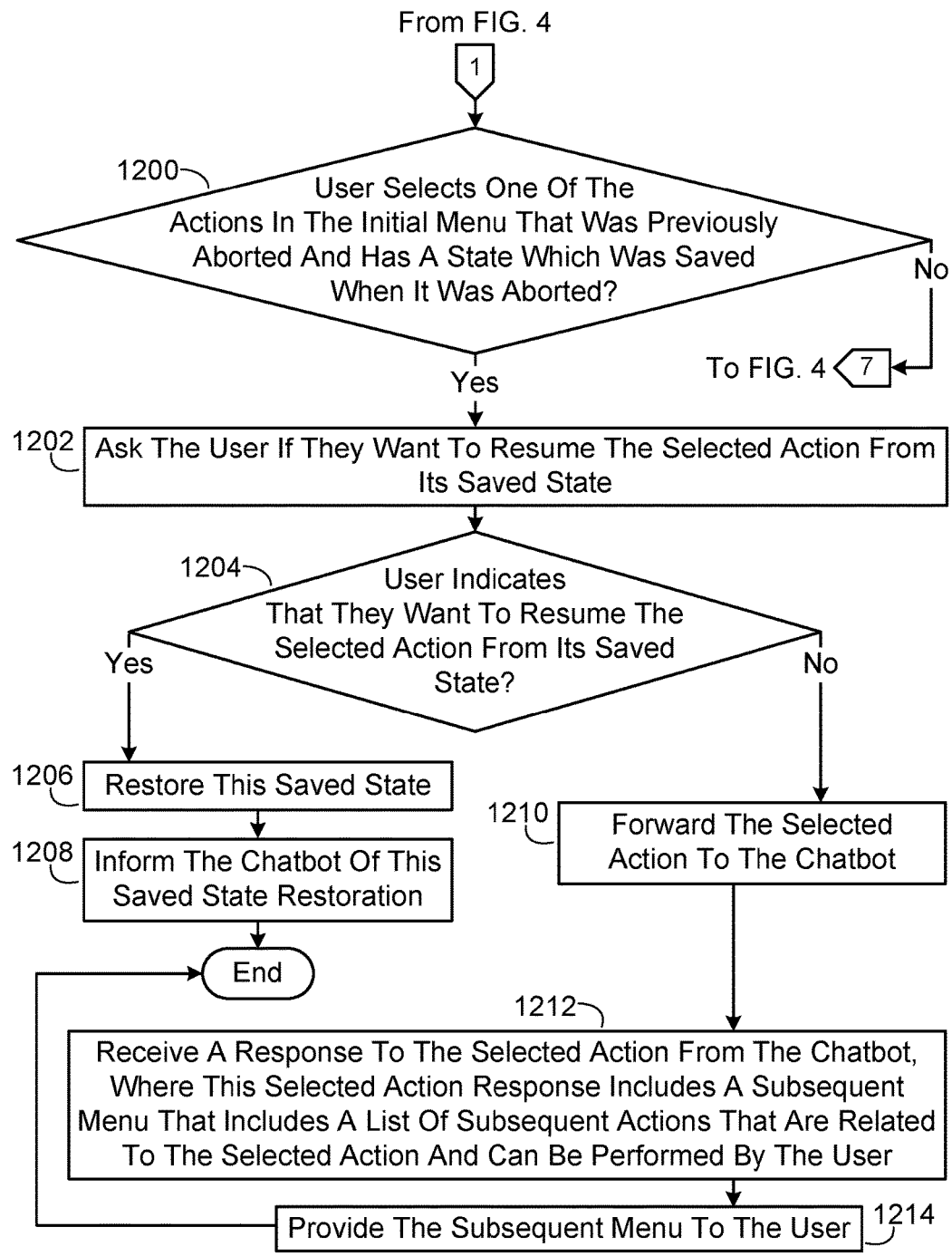

As exemplified in FIG. 12, whenever the user selects one of the actions in the initial menu that was previously aborted and has a state which was saved when it was aborted (process action 1200, Yes), the user is asked if they want to resume the selected action from its saved state (process action 1202). Then, upon receiving input from the user indicating that they want to resume the selected action from its saved state (process action 1204, Yes), this saved state is restored (process action 1206) and the chatbot is informed of this saved state restoration (process action 1208). In the case where input is received from the user indicating that they do not want to resume the selected action from its saved state (process action 1204, No), the selected action is forwarded to the chatbot (process action 1210). A response to the selected action is then received from the chatbot, where this selected action response includes a subsequent menu that includes a list of subsequent actions that are related to the selected action and can be performed by the user (process action 1212). This subsequent menu is then provided to the user (process action 1214).

Figure 13:
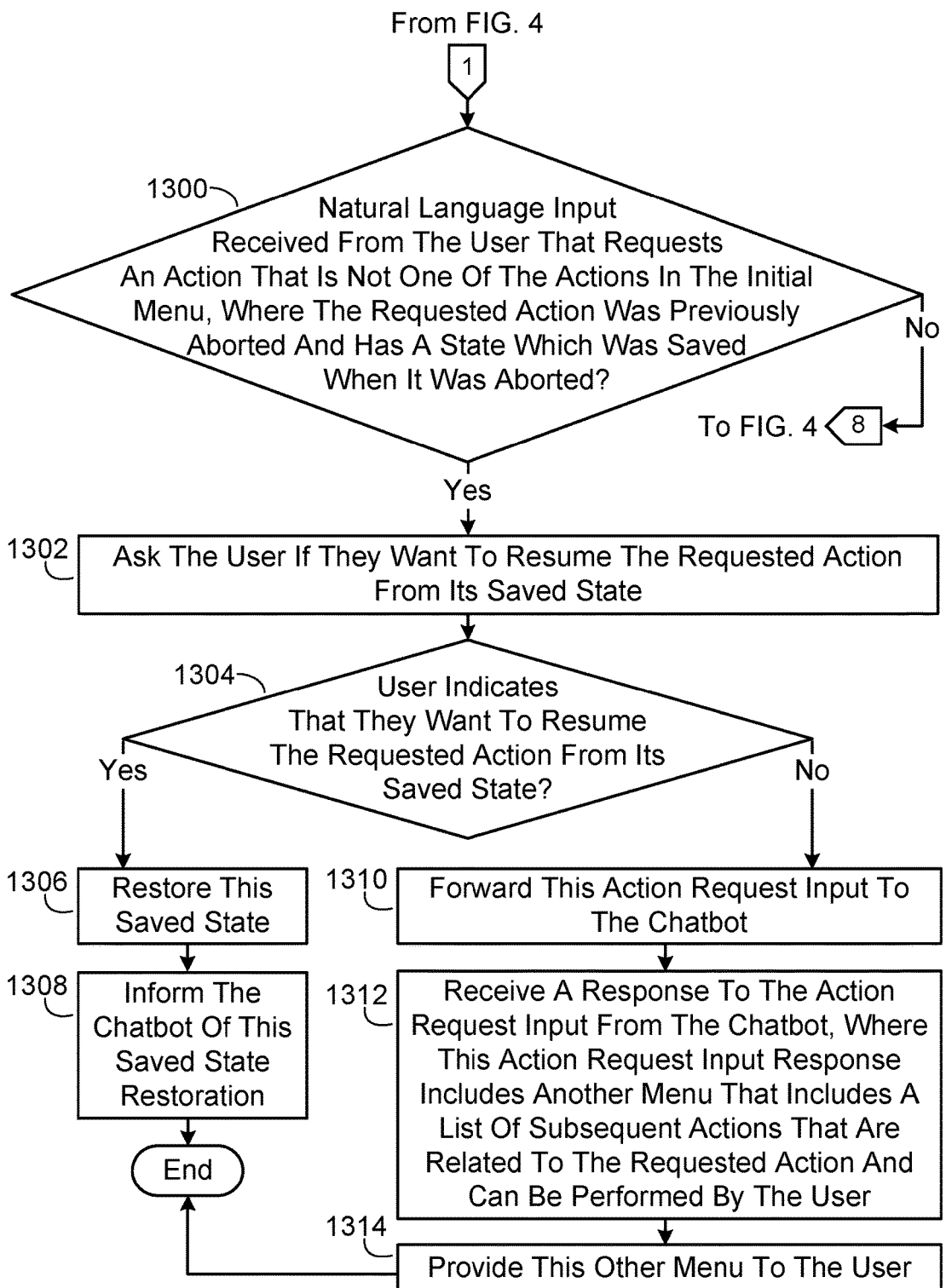

As exemplified in FIG. 13, whenever natural language input is received from the user that requests an action that is not one of the actions in the initial menu, where the requested action was previously aborted and has a state which was saved when it was aborted (process action 1300, Yes), the user is asked if they want to resume the requested action from its saved state (process action 1302). Then, upon receiving input from the user indicating that they want to resume the requested action from its saved state (process action 1304, Yes), this saved state is restored (process action 1306) and the chatbot is informed of this saved state restoration (process action 1308). In the case where input is received from the user indicating that they do not want to resume the requested action from its saved state (process action 1304, No), the action request input that was received from the user in action 1300 is forwarded to the chatbot (process action 1310). A response to this action request input is then received from the chatbot, where this action request input response includes another menu that includes a list of subsequent actions that are related to the requested action and can be performed by the user (process action 1312), and this other menu is provided to the user (process action 1314).

Figure 14:
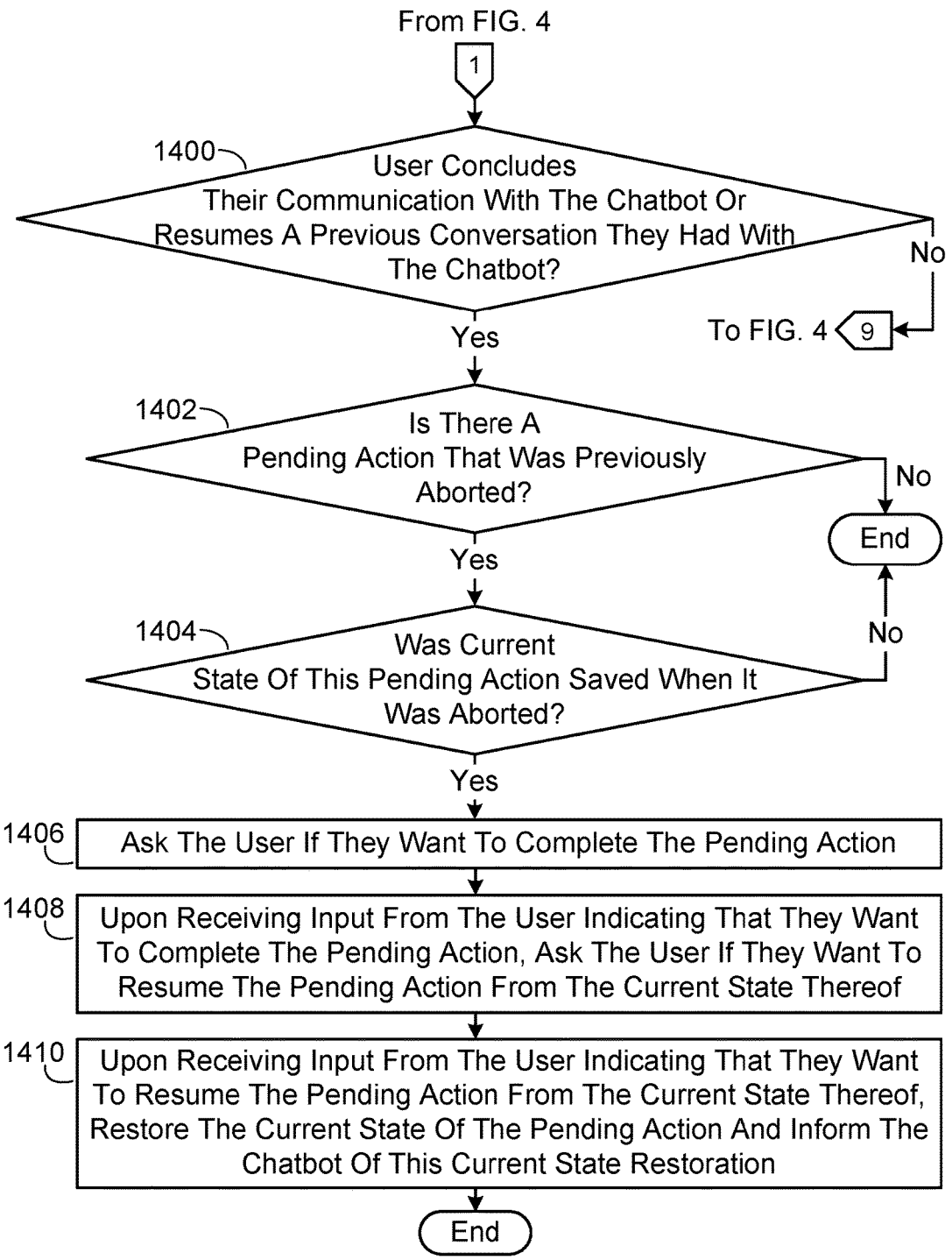

As exemplified in FIG. 14, whenever the user concludes their communication with the chatbot or resumes a previous conversation they had with the chatbot (process action 1400, Yes), and there exists a pending action that was previously aborted (process action 1402, Yes), and a current state of this pending action was saved when it was aborted (process action 1404, Yes), the user is asked if they want to complete the pending action (process action 1406). Then, upon receiving input from the user indicating that they want to complete the pending action, the user is asked if they want to resume the pending action from the current state thereof (process action 1408). Then, upon receiving input from the user indicating that they want to resume the pending action from the current state thereof, the current state of the pending action is restored and the chatbot is informed of this current state restoration (process action 1410).

Figure 15:
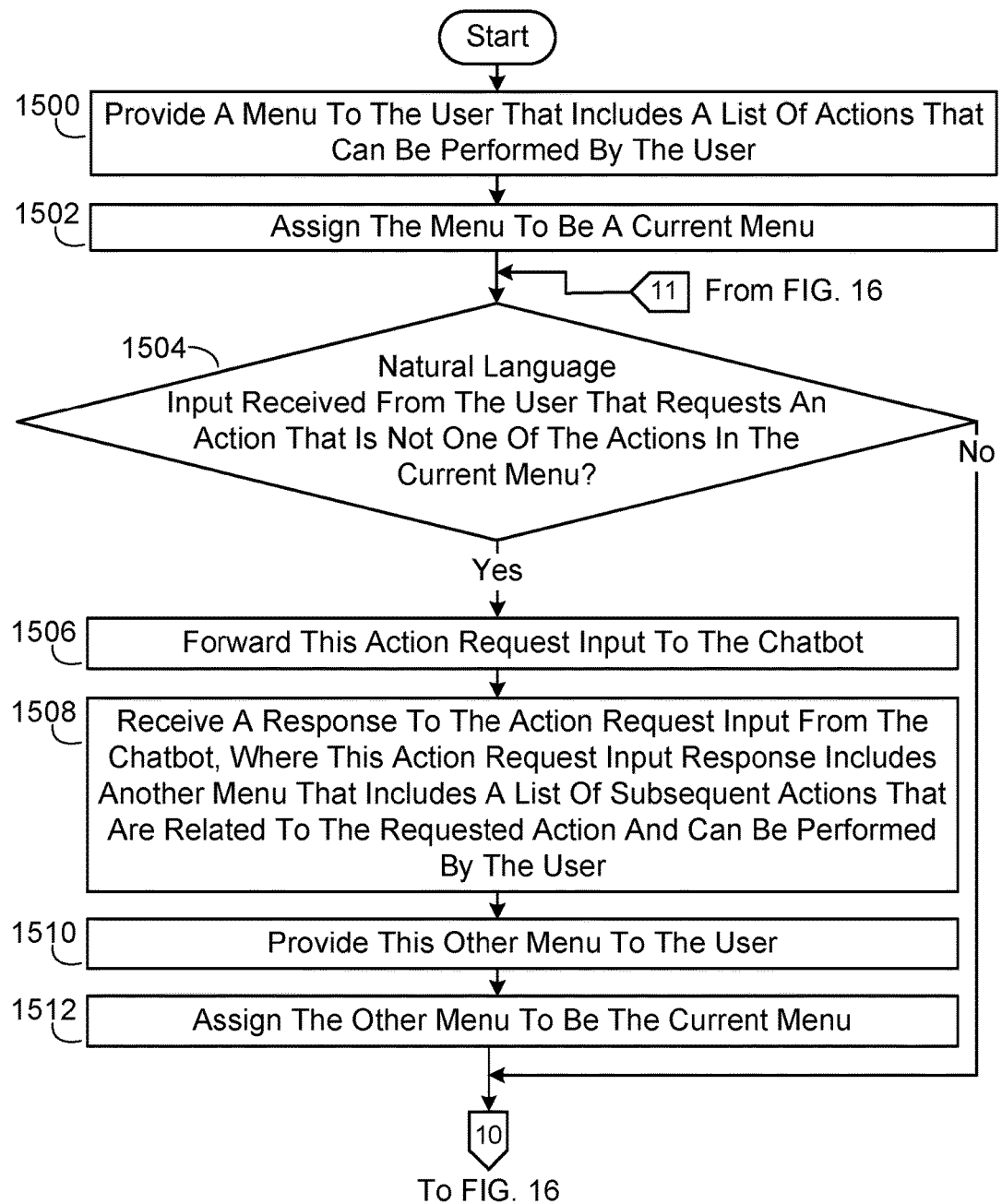
FIGS. 15 and 16 are a flow diagram illustrating another implementation, in simplified form, of a process for allowing a user to communicate with a chatbot.
Figure 16:
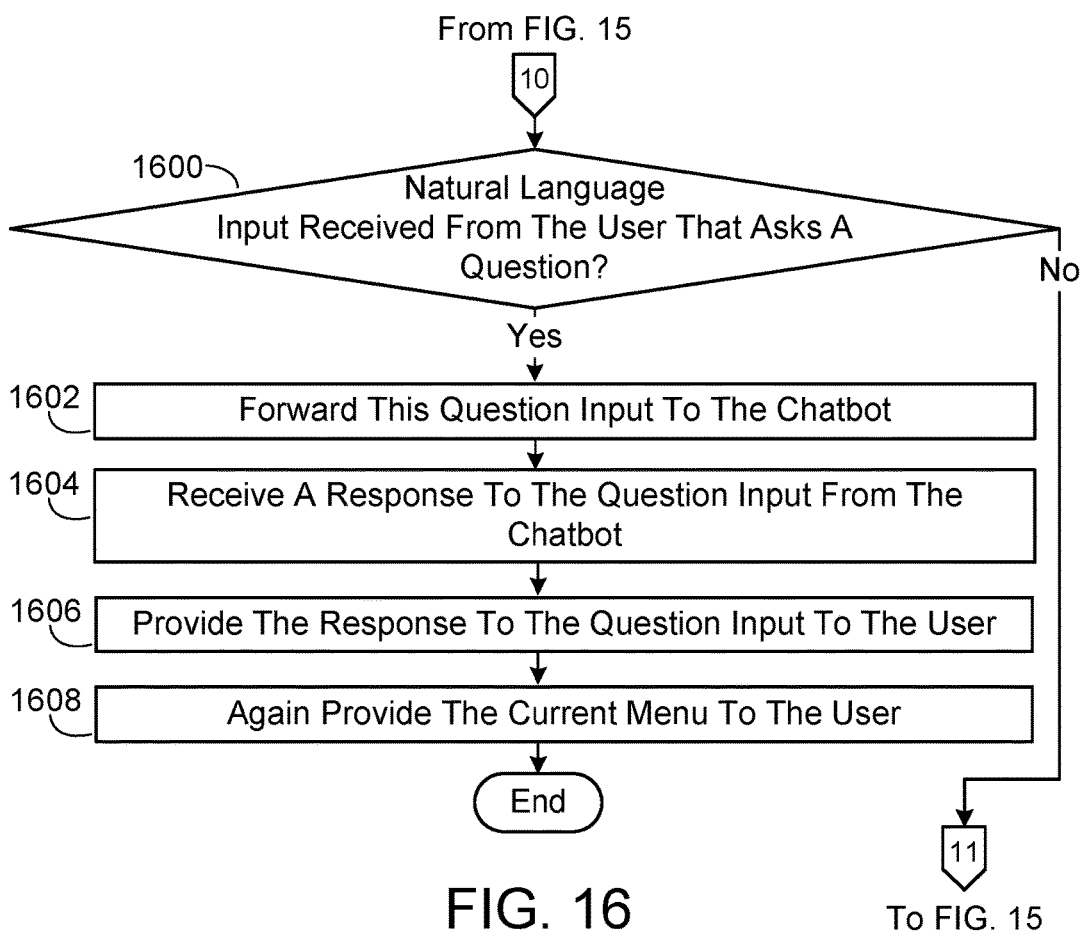

FIGS. 15 and 16 illustrate another implementation, in simplified form, of a process for allowing a user to communicate with a chatbot. In one implementation of the chatbot communication technique described herein the process illustrated in FIGS. 15 and 16 is realized on the system framework 100 illustrated in FIG. 1. In another implementation of the chatbot communication technique the process illustrated in FIGS. 15 and 16 is realized on the system framework 200 illustrated in FIG. 2. In yet another implementation of the chatbot communication technique the process illustrated in FIGS. 15 and 16 is realized on the system framework 300 illustrated in FIG. 3. As exemplified in FIG. 15 the process starts with providing a menu to the user, where this menu includes a list of actions that can be performed by the user (process action 1500), and assigning this menu to be a current menu (process action 1502). Given the foregoing it will be appreciated that the menu which is provided to the user in action 1500 may be either the aforementioned top-level menu or any one of the aforementioned sub-menus. Whenever natural language input is received from the user that requests an action that is not one of the actions in the current menu (process action 1504, Yes), this action request input is forwarded to the chatbot (process action 1506). A response to the action request input is then received from the chatbot, where this action request input response includes another menu that includes a list of subsequent actions that are related to the requested action and can be performed by the user (process action 1508). This other menu is then provided to the user (process action 1510) and it is assigned to be the current menu (process action 1512). It will be appreciated that the other menu that is received from the chatbot in action 1508 may be any one of the sub-menus in the aforementioned hierarchically-organized chain of nested sub-menus. It will also be appreciated that the combination of actions 1504, 1506, 1508 and 1510 has the technical effect of increasing the speed and accuracy by which the user is able to effectively communicate their desires to the chatbot, thus increasing the user's efficiency and productivity.

As exemplified in FIG. 16, whenever natural language input is received from the user that asks a question (process action 1600, Yes), this question input is forwarded to the chatbot (process action 1602). Then, upon receiving a response to the question input from the chatbot (process action 1604), this response is provided to the user (process action 1606) and the current menu is again provided to the user (process action 1608).

Figure 17:
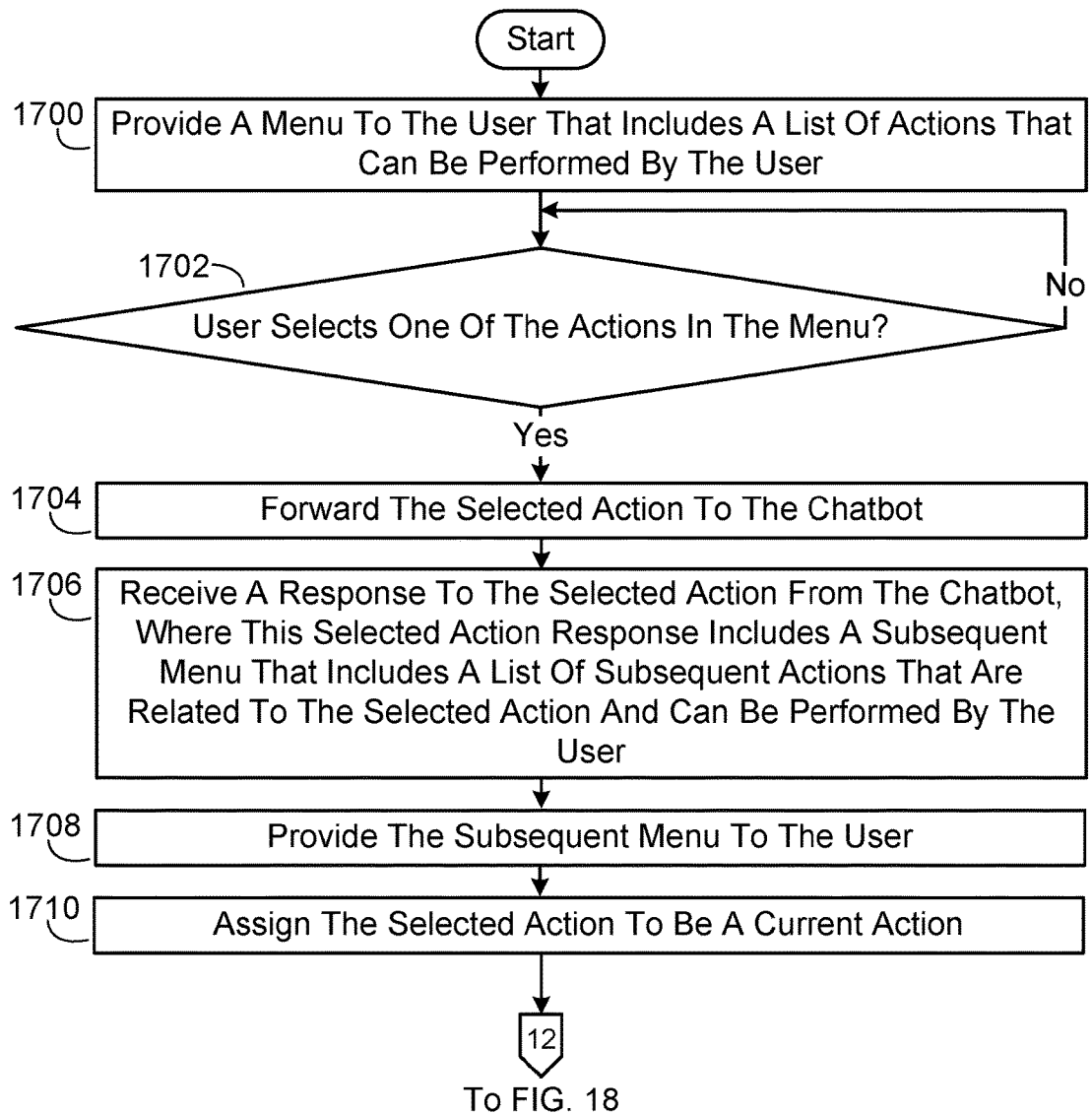
FIGS. 17-19 are a flow diagram illustrating yet another implementation, in simplified form, of a process for allowing a user to communicate with a chatbot.
Figure 18:
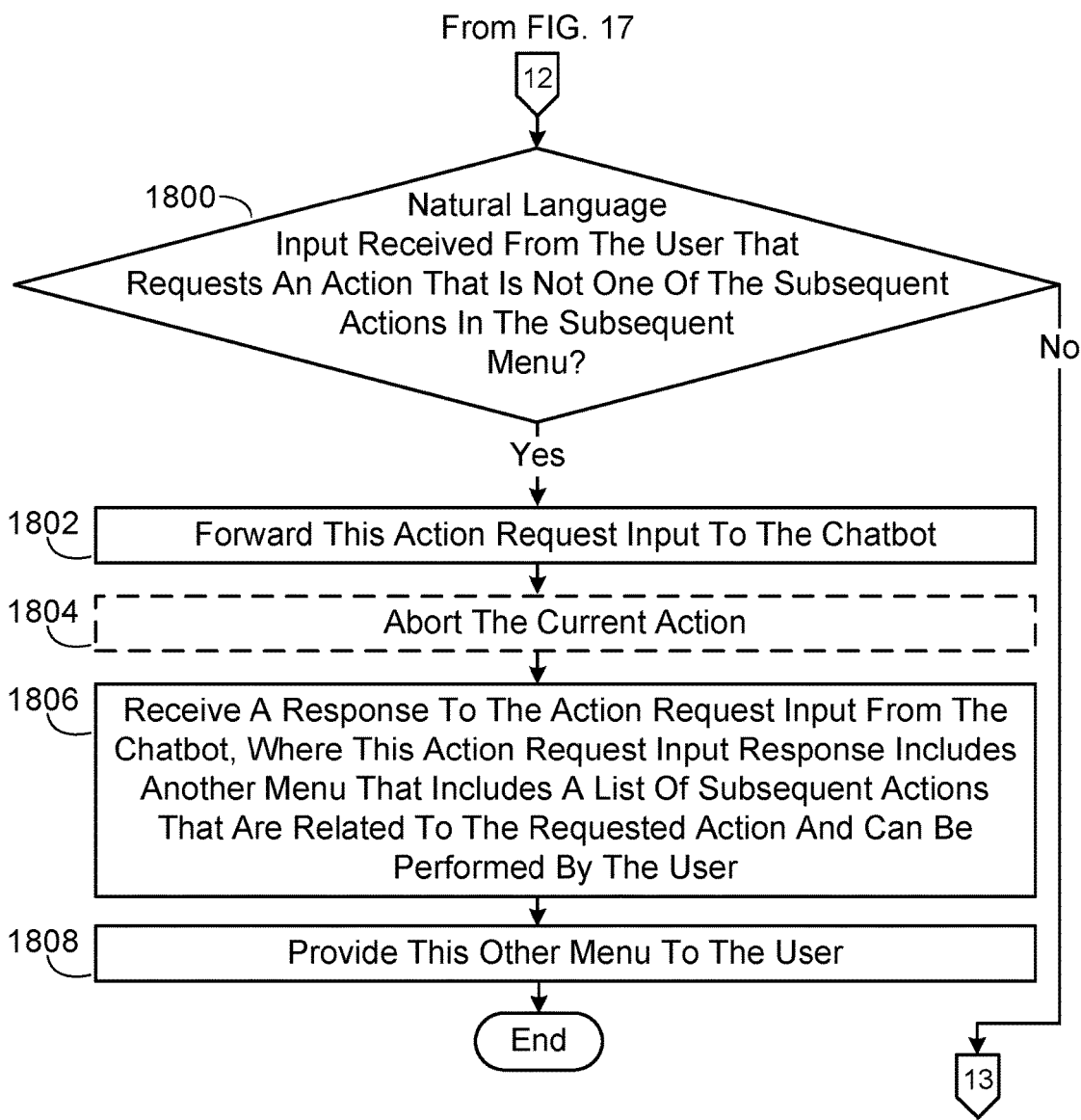
Figure 19:
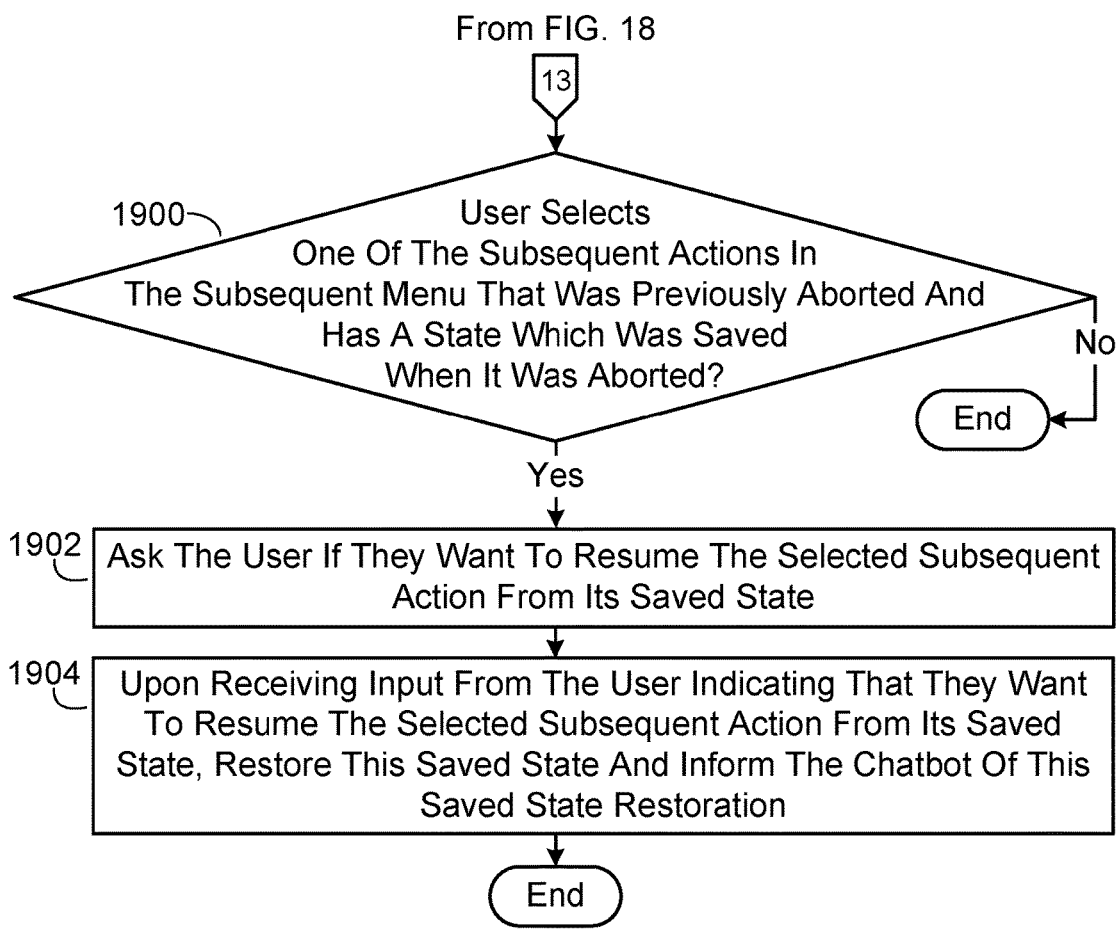

FIGS. 17-19 illustrate yet another implementation, in simplified form, of a process for allowing a user to communicate with a chatbot. In one implementation of the chatbot communication technique described herein the process illustrated in FIGS. 17-19 is realized on the system framework 100 illustrated in FIG. 1. In another implementation of the chatbot communication technique the process illustrated in FIGS. 17-19 is realized on the system framework 200 illustrated in FIG. 2. In yet another implementation of the chatbot communication technique the process illustrated in FIGS. 17-19 is realized on the system framework 300 illustrated in FIG. 3 As exemplified in FIG. 17 the process starts with providing a menu to the user, where this menu includes a list of actions that can be performed by the user (process action 1700). Given the foregoing it will be appreciated that the menu which is provided to the user in action 1700 may be either the aforementioned top-level menu or any one of the aforementioned sub-menus. Whenever the user selects one of the actions in the menu (process action 1702, Yes), the selected action is forwarded to the chatbot (process action 1704). A response to the selected action is then received from the chatbot, where this selected action response includes a subsequent menu that includes a list of subsequent actions that are related to the selected action and can be performed by the user (process action 1706). This subsequent menu is then provided to the user (process action 1708), and the selected action is assigned to be a current action (process action 1710). In an exemplary implementation of the chatbot communication technique described herein the subsequent menu that is received from the chatbot in action 1706 is one of the sub-menus in the aforementioned hierarchically-organized chain of nested sub-menus.

As exemplified in FIG. 18, whenever natural language input is received from the user that requests an action that is not one of the subsequent actions in the subsequent menu (process action 1800, Yes), this action request input is forwarded to the chatbot (process action 1802). Depending on the specific nature of the current action (e.g., the action that was selected by the user in action 1702) and the specific natural language input that is received from the user in action 1800, the current action may also be aborted (process action 1804). Exemplary situations where the current action will not be aborted have been described heretofore. After the action request input has been forward to the chatbot (action 1802), a response to the action request input is received from the chatbot, where this action request input response includes another menu that includes a list of subsequent actions that are related to the requested action and can be performed by the user (process action 1806). This other menu is then provided to the user (process action 1808). It will be appreciated that the other menu that is received from the chatbot in action 1806 may be any one of the sub-menus in the aforementioned hierarchically-organized chain of nested sub-menus. In an exemplary implementation of the chatbot communication technique described herein the just-described action of aborting the current action (action 1804) can optionally include saving the current state of the current action. The aborted current action will thus be considered to be a pending action. Given the foregoing, it will also be appreciated that the combination of actions 1800, 1802, 1804, 1806 and 1808 has the technical effect of increasing the speed and accuracy by which the user is able to effectively communicate their desires to the chatbot, thus increasing the user's efficiency and productivity.

As exemplified in FIG. 19, whenever the user selects one of the subsequent actions in the subsequent menu that was previously aborted and has a state which was saved when it was aborted (process action 1900, Yes), the user is asked if they want to resume the selected subsequent action from its saved state (process action 1902). Then, upon receiving input from the user indicating that they want to resume the selected subsequent action from its saved state, this saved state is restored and the chatbot is informed of this saved state restoration (process action 1904).

Figure 21:
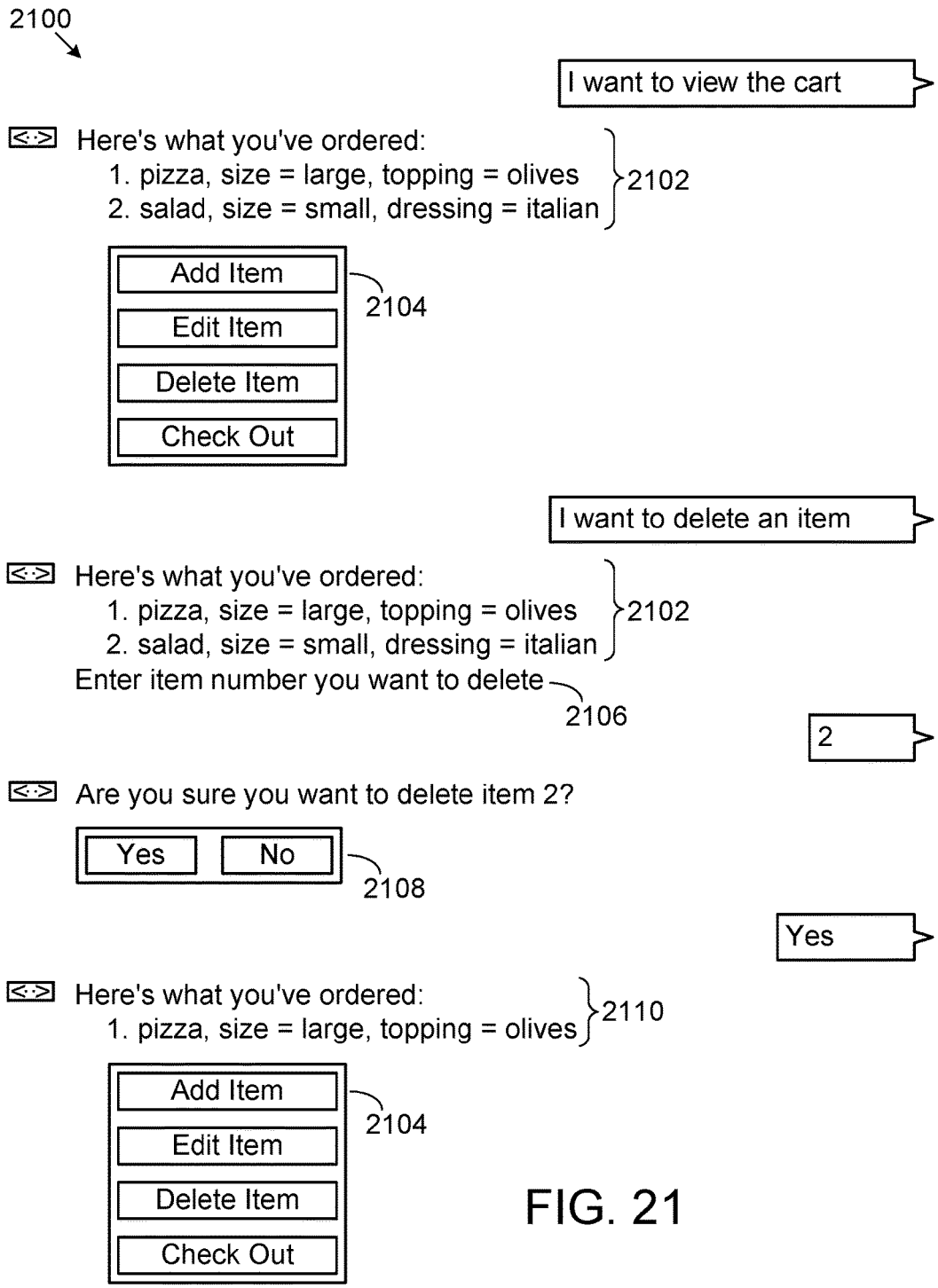

FIGS. 20 and 21 illustrate an exemplary conversation, in a simplified and abbreviated form, that a user has with an exemplary chatbot that is employed by a pizzeria (namely Joe's Pizza) according to the chatbot communication technique implementations described herein. As exemplified in FIG. 20, the conversation 2000 starts with the user submitting the query "Hi" to the chatbot. The chatbot responds to this query with the welcome message "Welcome to Joe's Pizza. I can take your order, make a reservation, or answer any questions you have. How can I help you?" The chatbot's query response also includes an initial menu 2002 that lists the actions that the user can perform (namely, the user can place an order for Joe's Pizza, get the hours that Joe's Pizza is open, make a reservation for Joe's Pizza, and get contact information for Joe's Pizza). The user responds to this welcome message and initial menu 2002 by asking the question "How late are you open?". The chatbot responds to this question by asking the user "Which day interests you?". The user responds by saying "Saturday". The chatbot responds by telling the user that Joe's Pizza is open from 11:00 AM till 10:00 PM on Saturdays. The chatbot also asks the user "What would you like to do?" and again provides the initial menu 2002 to the user. Rather than selecting one of the actions listed in the initial menu 2002, the user responds by simply saying "I want a pizza". The chatbot responds to this request by asking the user to "Select a size" and provides the user with another menu 2004 that lists the size options (namely, Small, Medium and Large). The user continues to specify their order (not shown).

As exemplified in FIG. 21, after the user has finished specifying their order (not shown) the conversation 2100 between the user and the chatbot continues as follows. The user says "I want to view the cart". The chatbot responds to this request by telling the user the current contents of their order cart 2102 and provides the user with another menu 2104 that lists the actions that the user can now perform (namely, the user can add an item to their order, edit an item in their order, delete an item from their order, or check out (e.g., place) their order). The user responds by saying "I want to delete an item". The chatbot responds to this request by again telling the user the current contents of their order cart 2102 and asking the user to specify the number of the item that they want to delete 2106. The user responds by saying item "2". The chatbot responds by asking the user to confirm that they "want to delete item 2" and provides the user with another menu 2108 which allows the user to select "Yes" or "No" as their confirmation answer. After the user responds by saying "Yes" as their confirmation answer, the chatbot tells the user the revised contents of their order cart 2110 and again provides the user with the other menu 2104.

It is noted that although the user submits each of their inputs to the chatbot in the just-described conversation illustrated in FIGS. 20 and 21 using natural language, the user may also choose to submit certain ones of their inputs to the chatbot by manually selecting (e.g., tapping or clicking on) a desire action that is listed in a given menu. For example, rather than saying "I want to delete an item" as shown in FIG. 21, the user may choose to manually select the "Delete Item" button in the menu 2104. Rather than saying "Yes" the user may choose to manually select the "Yes" button in the menu 2108. It is also noted that in response to being presented with a given menu of actions, the user is free to request an action that does not appear in the menu but is contextually related to the actions that do appear in the menu. For example, in response to the chatbot's request for the user to "Select a size" and being presented with the menu 2004 of possible sizes as shown in FIG. 20, the user may select from the "Small", "Medium", "Large" options listed in the menu 2004, or the user may say something like "extra large".

Figure 22:
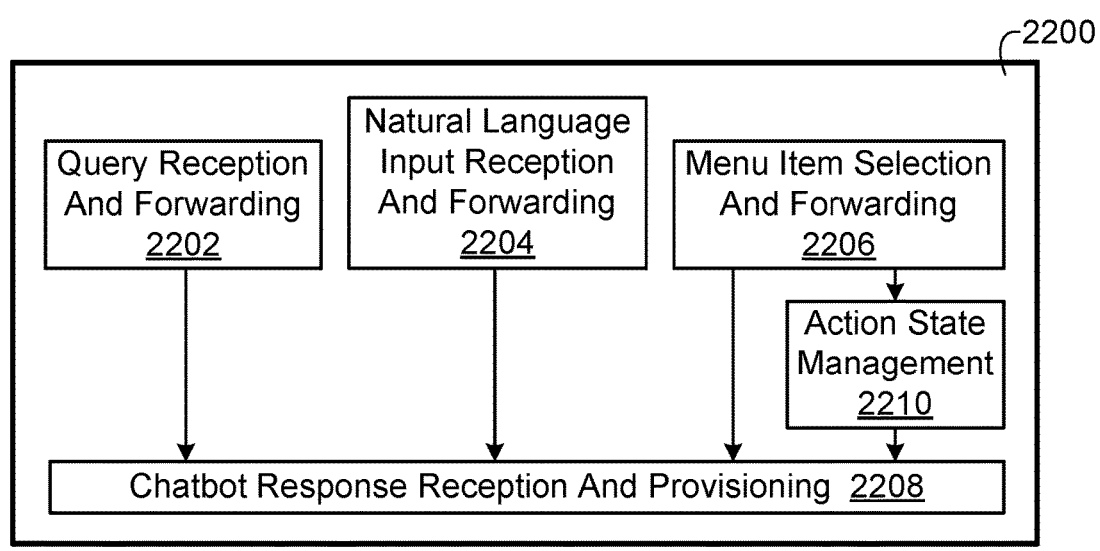
FIG. 22 is a diagram illustrating an exemplary implementation, in simplified form, of a chatbot communicator computer program for allowing a user to communicate with a chatbot.

FIG. 22 illustrates an exemplary implementation, in simplified form, of a chatbot communicator computer program for allowing a user to communicate with a chatbot. As exemplified in FIG. 22 and referring again to FIGS. 4-19, the chatbot communicator computer program 2200 includes, but is not limited to, a query reception and forwarding sub-program 2202, a natural language input reception and forwarding sub-program 2204, a menu item selection and forwarding sub-program 2206, a chatbot response reception and provisioning sub-program 2208, and an action state management sub-program 2210. In an exemplary implementation of the chatbot communication technique described herein the query reception and forwarding sub-program 2202 performs actions 400 and 402. The natural language input reception and forwarding sub-program 2204 performs actions 500, 502, 600, 602, 800, 802, 804, 900, 902, 904, 1102, 1104, 1106, 1504, 1506, 1600, 1602, 1800, 1802 and 1804. The menu item selection and forwarding sub-program 2206 performs actions 700, 702, 1000, 1002, 1004, 1100, 1200, 1300, 1702, 1704 and 1900. The chatbot response reception and provisioning sub-program 2208 performs actions 404, 406, 408, 504, 506, 508, 604, 606, 704, 706, 708, 806, 808, 1312, 1314, 1500, 1502, 1508, 1510, 1512, 1604, 1606, 1608, 1700, 1706, 1708, 1710, 1806 and 1808. The action state management sub-program 2210 performs actions 1202, 1204, 1206, 1208, 1210, 1212, 1302, 1304, 1306, 1308, 1310, 1400, 1402, 1404, 1406, 1408, 1410, 1902 and 1904. Each of the just-described sub-programs is realized on a computing device such as that which is described in more detail in the Exemplary Operating Environments section which follows. More particularly and by way of example but not limitation, and referring again to FIGS. 1-3, in one implementation of the chatbot communication technique described herein the just-described sub-programs may be realized on the computing devices 112/114. In another implementation of the chatbot communication technique the just-described sub-programs may be realized on the computing device 204. In yet another implementation of the chatbot communication technique the just-described sub-programs may be realized on the computing devices upon which each chatbot 308/312 is realized.

3.0 Other Implementations

While the chatbot communication technique has been described by specific reference to implementations thereof, it is understood that variations and modifications thereof can be made without departing from the true spirit and scope of the chatbot communication technique. It is noted that any or all of the implementations that are described in the present document and any or all of the implementations that are illustrated in the accompanying drawings may be used and thus claimed in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

4.0 Exemplary Operating Environments

Figure 23:
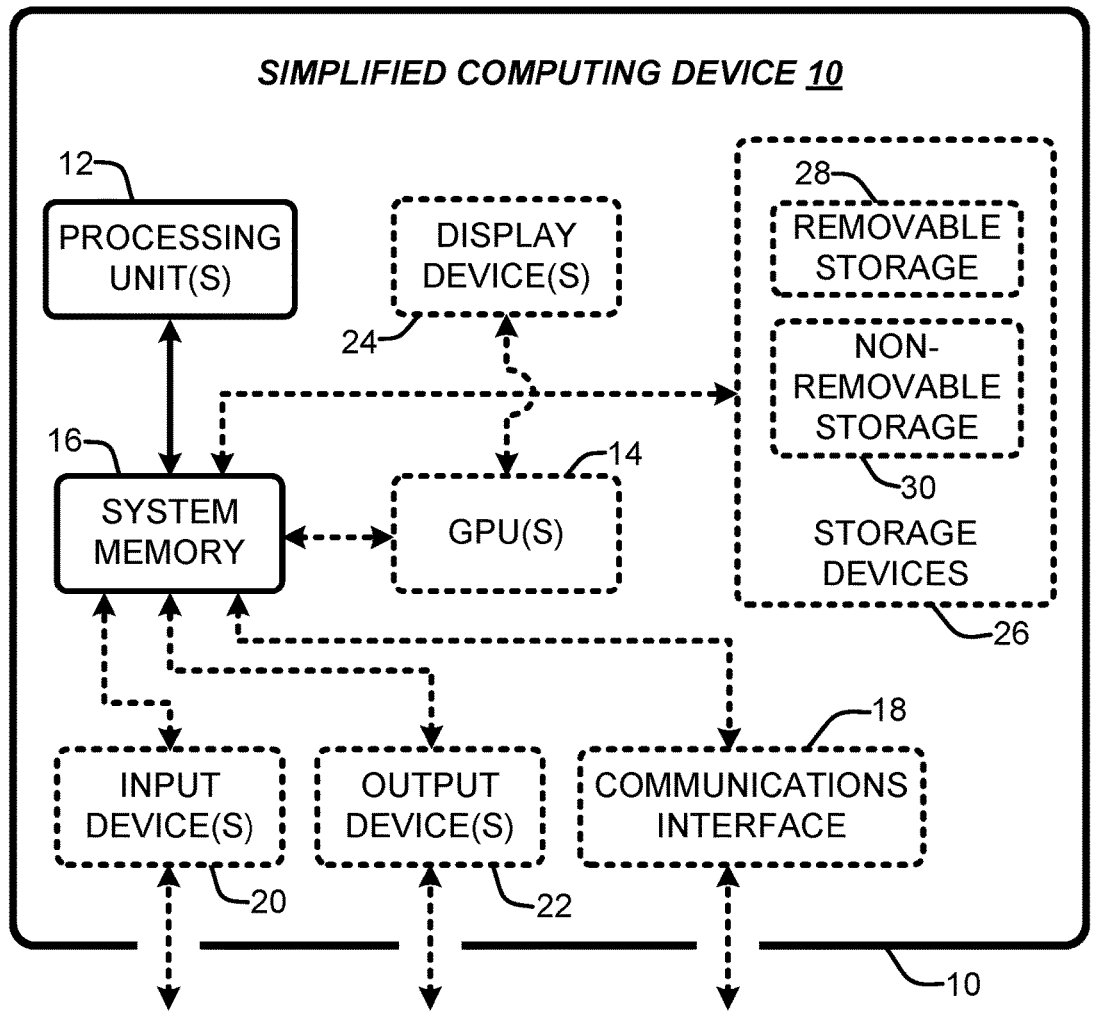
FIG. 23 is a diagram illustrating a simplified example of a general-purpose computer system on which various implementations and elements of the chatbot communication technique, as described herein, may be realized.

The chatbot communication technique implementations described herein are operational within numerous types of general purpose or special purpose computing system environments or configurations. FIG. 23 illustrates a simplified example of a general-purpose computer system on which various implementations and elements of the chatbot communication technique, as described herein, may be implemented. It is noted that any boxes that are represented by broken or dashed lines in the simplified computing device 10 shown in FIG. 23 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the chatbot communication technique implementations described herein, the device should have a sufficient computational capability and system memory to enable basic computational operations. In particular, the computational capability of the simplified computing device 10 shown in FIG. 23 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the chatbot communication technique implementations described herein, including input, output, control, feedback, and response to one or more users or other devices or systems associated with the chatbot communication technique implementations, are enabled by a variety of Natural User Interface (NUI) scenarios. The NUI techniques and scenarios enabled by the chatbot communication technique implementations include, but are not limited to, interface technologies that allow one or more users user to interact with the chatbot communication technique implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the chatbot communication technique implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the chatbot communication technique implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 23 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various chatbot communication technique implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The chatbot communication technique implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The chatbot communication technique implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

Wherefore, what is claimed is:

1. A system for allowing a user to communicate with a chatbot, comprising:
   a chatbot communicator comprising one or more computing devices, said computing devices being in communication with each other via a computer network whenever there is a plurality of computing devices, and a computer program having a plurality of sub-programs executable by said computing devices, wherein the sub-programs configure said computing devices to,
   provide a menu to the user, the menu comprising a list of actions that can be selected by the user, one or more of said menu-based list of actions being specific tasks that the chatbot can perform for the user, and
   whenever the user selects one of the actions from the list, forward the selected action to the chatbot for performance by the chatbot,
   receive a response from the chatbot comprising a subsequent menu listing one or more subsequent actions that are related to the selected action, which can be selected by the user, and wherein one or more of the subsequent actions is a specific task that the chatbot can perform for the user, and
provide the subsequent menu to the user, and
whenever natural language input is received from the user that asks a question,
forward said question input to the chatbot,
receive a response to said question input from the chatbot,
provide the response to said question input to the user, and
again provide the menu to the user.

2. The system of claim 1, wherein the natural language input comprises a text string that is manually entered by the user.

3. The system of claim 1, wherein the natural language input comprises one of:
a word that is spoken by the user; or
a phrase that is spoken by the user; or
one or more sentences that are spoken by the user.

4. The system of claim 1, wherein the sub-programs further configure said computing devices to:
prior to providing the menu to the user,
receive a query submitted by the user,
forward the query to the chatbot,
receive a response to the query from the chatbot, said query response comprising the menu and a welcome message that encourages the user to communicate with the chatbot using natural language and describes the capabilities of the chatbot, and
provide the welcome message to the user.

5. The system of claim 1, wherein the sub-programs further configure said computing devices to:
whenever natural language input is received from the user that requests an action that is not one of the actions in the menu,
forward said action request input to the chatbot,
receive a response to said action request input from the chatbot, said action request input response comprising another menu comprising a list of subsequent actions that are related to the requested action and can be selected by the user, and
provide said other menu to the user.

6. The system of claim 1, wherein the sub-programs further configure said computing devices to:
whenever the user selects one of the actions in the menu, assign the selected action to be a current action; and
whenever natural language input is received from the user that requests an action that is not one of the subsequent actions in the subsequent menu,
abort the current action,
forward said action request input to the chatbot,
receive a response to said action request input from the chatbot, said action request input response comprising another menu comprising a list of subsequent actions that are related to the requested action and can be performed by the user, and
provide said other menu to the user.

7. The system of claim 6, wherein the sub-program for aborting the current action comprises a sub-program for saving a current state of the current action.

8. The system of claim 6, wherein the sub-programs further configure said computing devices to:
whenever natural language input is received from the user that requests to abort the current action altogether,
forward said abort request input to the chatbot, and
again provide the menu to the user.

9. The system of claim 8, wherein the sub-program for forwarding said abort request input to the chatbot comprises a sub-program for saving a current state of the current action.

10. The system of claim 6, wherein one of the subsequent actions is an abort action and the sub-programs further configure said computing devices to:
whenever the user selects the abort action,
forward said abort action selection to the chatbot, and
again provide the menu to the user.

11. The system of claim 10, wherein the sub-program for forwarding said abort action selection to the chatbot comprises a sub-program for saving a current state of the current action.

12. The system of claim 6, wherein the sub-programs further configure said computing devices to:
whenever the user selects one of the subsequent actions in the subsequent menu, forward the selected subsequent action to the chatbot; and
whenever natural language input is received from the user that requests to cancel the selected subsequent action,
forward said cancellation request input to the chatbot, and
again provide the subsequent menu to the user.

13. The system of claim 1, wherein the sub-programs further configure said computing devices to:
whenever the user selects one of the actions in the menu that was previously aborted and has a state which was saved when it was aborted,
ask the user if they want to resume the selected action from said saved state, and
upon receiving input from the user indicating that they want to resume the selected action from said saved state,
restore said saved state, and
inform the chatbot of said saved state restoration.

14. The system of claim 1, wherein the sub-programs further configure said computing devices to:
whenever natural language input is received from the user that requests an action that is not one of the actions in the menu, wherein the requested action was previously aborted and has a state which was saved when it was aborted,
ask the user if they want to resume the requested action from said saved state, and
upon receiving input from the user indicating that they want to resume the requested action from said saved state,
restore said saved state, and
inform the chatbot of said saved state restoration.

15. The system of claim 1, wherein the sub-programs further configure said computing devices to:
whenever the user concludes their communication with the chatbot or resumes a previous conversation they had with the chatbot, and there exists a pending action that was previously aborted, and a current state of said pending action was saved when it was aborted,
ask the user if they want to complete said pending action,
upon receiving input from the user indicating that they want to complete said pending action, ask the user if they want to resume said pending action from the current state thereof, and
upon receiving input from the user indicating that they want to resume said pending action from the current state thereof,
restore the current state of said pending action, and inform the chatbot of said current state restoration.

16. The system of claim 1, wherein the menu is one of:
a top-level menu of a user-navigable, hierarchically-organized chain of nested sub-menus; or
a one of said sub-menus.

17. A system for allowing a user to communicate with a chatbot, comprising:
a chatbot communicator comprising one or more computing devices, said computing devices being in communication with each other via a computer network whenever there is a plurality of computing devices, and
a computer program having a plurality of sub-programs executable by said computing devices, wherein the sub-programs configure said computing devices to,
provide a menu to the user, the menu comprising a list of actions that can be performed by the user,
assign the menu to be a current menu, and
whenever natural language input is received from the user that requests an action that is not one of the actions in the current menu,
forward said action request input to the chatbot,
receive a response to said action request input from the chatbot, said action request input response comprising another menu comprising a list of subsequent actions that are related to the requested action and can be performed by the user,
provide said other menu to the user, and
assign said other menu to be the current menu.

18. The system of claim 17, wherein the sub-programs further configure said computing devices to:
whenever natural language input is received from the user that asks a question,
forward said question input to the chatbot,
receive a response to said question input from the chatbot,
provide the response to said question input to the user, and
again provide the current menu to the user.

19. A computer-implemented process for allowing a user to communicate with a chatbot, the process comprising the actions of:
using one or more computing devices to perform the following process actions, the computing devices being in communication with each other via a computer network whenever a plurality of computing devices is used:
providing a menu to the user, the menu comprising a list of actions that can be performed by the user;
whenever the user selects one of the actions in the menu,
forwarding the selected action to the chatbot,
receiving a response to the selected action from the chatbot, said selected action response comprising a subsequent menu comprising a list of subsequent actions that are related to the selected action and can be performed by the user,
providing the subsequent menu to the user, and
assigning the selected action to be a current action; and
whenever natural language input is received from the user that requests an action that is not one of the subsequent actions in the subsequent menu,
aborting the current action,
forwarding said action request input to the chatbot,
receiving a response to said action request input from the chatbot, said action request input response comprising another menu comprising a list of subsequent actions that are related to the requested action and can be performed by the user, and
providing said other menu to the user.

20. The process of claim 19, further comprising the actions of:
whenever the user selects one of the subsequent actions in the subsequent menu that was previously aborted and has a state which was saved when it was aborted,
asking the user if they want to resume the selected subsequent action from said saved state, and
upon receiving input from the user indicating that they want to resume the selected subsequent action from said saved state,
restoring said saved state, and
informing the chatbot of said saved state restoration.

* * * * *